(12) United States Patent
Fischel

(10) Patent No.: US 9,337,474 B1
(45) Date of Patent: May 10, 2016

(54) ELECTRODES FOR ELECTROCHEMICAL CELLS

(71) Applicant: Halbert P Fischel, Las Vegas, NV (US)

(72) Inventor: Halbert P Fischel, Las Vegas, NV (US)

(73) Assignee: Halbert P. Fischel, Las Vegas, NV (US)

( * ) Notice: Subject to any disclaimer, the term of this patent is extended or adjusted under 35 U.S.C. 154(b) by 0 days.

(21) Appl. No.: 14/717,139

(22) Filed: May 20, 2015

Related U.S. Application Data

(60) Provisional application No. 62/086,836, filed on Dec. 3, 2014.

(51) Int. Cl.
| | |
|---|---|
| *H01M 4/133* | (2010.01) |
| *H01M 4/66* | (2006.01) |
| *H01G 11/32* | (2013.01) |
| *H01G 11/04* | (2013.01) |
| *H01M 4/1393* | (2010.01) |
| *H01M 10/058* | (2010.01) |
| *H01M 4/02* | (2006.01) |

(52) U.S. Cl.
CPC .............. *H01M 4/133* (2013.01); *H01G 11/04* (2013.01); *H01G 11/32* (2013.01); *H01M 4/661* (2013.01); *H01M 2004/021* (2013.01)

(58) Field of Classification Search
None
See application file for complete search history.

(56) References Cited

U.S. PATENT DOCUMENTS

| | | | | | |
|---|---|---|---|---|---|
| 3,490,952 | A | * | 1/1970 | Balaguer | H01M 2/021 429/136 |
| 3,930,094 | A | * | 12/1975 | Sampson | H01M 4/86 264/49 |
| 4,386,987 | A | * | 6/1983 | Covitch | C25B 9/10 156/155 |
| 5,234,778 | A | * | 8/1993 | Wright | H01M 4/661 429/103 |
| 7,955,535 | B2 | | 6/2011 | Liang et al. | |
| 7,964,301 | B2 | | 6/2011 | Fischel et al. | |
| 7,971,489 | B2 | | 7/2011 | Pushparaj et al. | |
| 7,972,747 | B2 | | 7/2011 | Fischel | |
| 8,017,261 | B2 | | 9/2011 | Halbert | |

(Continued)

FOREIGN PATENT DOCUMENTS

CN 102306800 A * 1/2012 ............. H01M 4/66

OTHER PUBLICATIONS

Laurencelle, F., et al, "Characterization of a Ballard MK5-E proton exchange membrane stack", Fuel Cells, 1(1) 66-71. (2001).

(Continued)

*Primary Examiner* — Jonathan Crepeau
*Assistant Examiner* — Jacob Buchanan
(74) *Attorney, Agent, or Firm* — Bachman & LaPointe, P.C.

(57) ABSTRACT

The electrode (10) includes an electrically conductive surface (14) with a galvanic pellicle, or carbon nanotube mat (18), secured to the conductive surface (14). The pellicle (18) has a first surface (20) and an opposed outer surface (22) and defines an uncompressed thickness dimension (24) as a longest length of a straight axis (26) extending from the first surface (20) to the outer surface (22) of an uncompressed section (28) of the galvanic pellicle (18). Uncompressed sections (28) of the pellicle are defined between connected areas (30) and continuous connected areas (32) of the pellicle (18). Any point (35) within any uncompressed section (28) is no more distant from one of a nearest connected area (30) and or a nearest segment (34) of a continuous connected area (32) than about ten times the uncompressed thickness dimension (24) of the pellicle (18), thereby achieving significantly reduced contact resistance.

38 Claims, 16 Drawing Sheets

(56) References Cited

U.S. PATENT DOCUMENTS

| | | | |
|---|---|---|---|
| 8,021,747 B2 | 9/2011 | Yi et al. | |
| 8,124,296 B1 | 2/2012 | Fischel | |
| 8,147,767 B2 | 4/2012 | Fischel | |
| 8,158,277 B1* | 4/2012 | Fischel | H01M 8/08 429/50 |
| 8,173,217 B2 | 5/2012 | Shin et al. | |
| 8,187,560 B2 | 5/2012 | Fischel | |
| 8,213,157 B2 | 7/2012 | Wei et al. | |
| 8,283,062 B2 | 10/2012 | Fischel | |
| 8,283,275 B2 | 10/2012 | Heo et al. | |
| 8,333,810 B1 | 12/2012 | Meyyappan | |
| 8,394,518 B2 | 3/2013 | Fischel et al. | |
| 8,415,012 B2 | 4/2013 | Zheng et al. | |
| 8,703,355 B2 | 4/2014 | Zhang et al. | |
| 8,951,697 B2 | 2/2015 | Zhang et al. | |
| 2002/0180094 A1* | 12/2002 | Gough | B29C 59/04 264/127 |
| 2005/0104243 A1* | 5/2005 | Mercuri | C04B 35/536 264/69 |
| 2006/0172134 A1* | 8/2006 | Ro | C23C 8/20 428/408 |
| 2008/0241685 A1* | 10/2008 | Hinoki | H01M 4/13 429/209 |
| 2010/0086837 A1* | 4/2010 | Asari | H01G 9/0029 429/94 |
| 2010/0119932 A1* | 5/2010 | Nakura | H01M 2/348 429/163 |
| 2010/0178543 A1* | 7/2010 | Gruner | H01M 4/663 429/121 |
| 2011/0123866 A1* | 5/2011 | Pan | H01M 2/16 429/221 |
| 2013/0045413 A1* | 2/2013 | Wang | H01M 4/13 429/163 |
| 2014/0317920 A1* | 10/2014 | Vanderleeden | H01M 8/1004 29/852 |
| 2015/0104714 A1* | 4/2015 | Galande | H01M 4/13 429/233 |

OTHER PUBLICATIONS

Kim J., Lee S-M., Srinivasan S., and Chamberlin C.E., "Modeling of proton exchange membrane fuel cell performance with an empirical equation", Journal of the Electrochemical Society, 142(8), 2670-2674. (1995).

Koper, M., Ed., Fuel Cell Catalysis, Wiley, Ch. 3, p. 70 (2009).

Newman, J. et al, Electrochemical Systems, Wiley, Chapter 22 and Table. 11.1, p. 284 (2004).

Bagotsky, V. S., Fundamentals of Electrochemistry, Wiley, Chapter 4,4, pp. 60-61 (2006).

Conway, B.E., Electrochemical Supercapacitors, Plenum, Ch: 16, 17. (1999).

Bockris, J. O. et al, Modern Electrochemistry, 2nd Edition, Kluwer Academic/Plenum, Chapter 13.5, pp. 1812-1813. (2000).

Chung, H.T., et al, Nature Communications, Active and stable carbon nanotube/nanoparticle composite electrocatalyst for oxygen reduction (May 28, 2013).

Gorlin, Y., JACS Communications, A Bifunctional Nonprecious Metal Catalyst for Oxygen Reduction and Water Oxidation (Sep. 14, 2010).

Wang. H,, et al, Nature Communications (May 21, 2012).

Zou, Xiaoxin, et al, Cobalt-Embedded Nitrogen-Rich Carbon Nanotubes Efficiently Catalyze Hydrogen Evolution Reaction at All pH Values, Angewandte Chemie, 126, 4461-4465 (2014).

Ma, Xiaohua et al, High Rate Micrometer Ordered $LiNi0.5Mn1.5O4$, Journal of the Electrochemical Society, 157 (8) pp. A925-A931 (2010).

\* cited by examiner

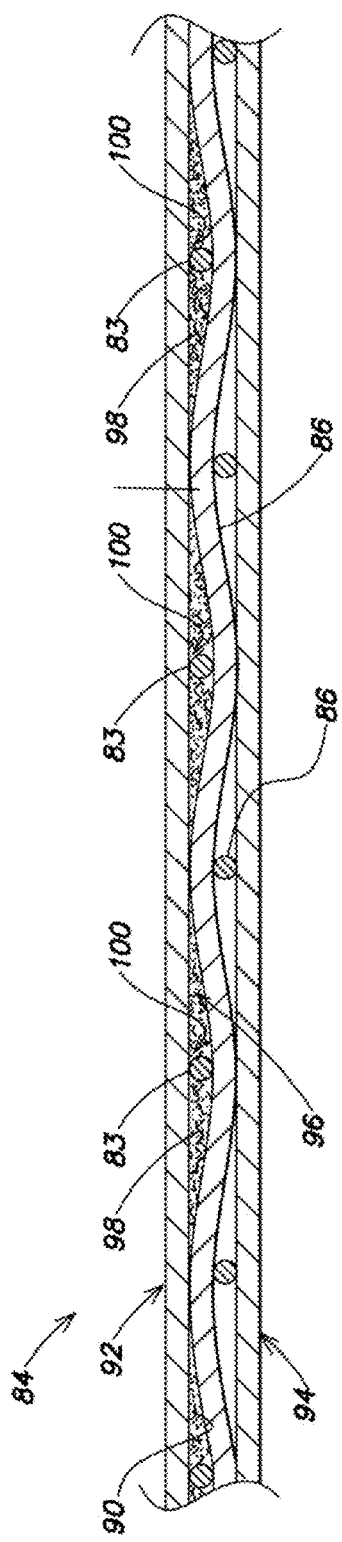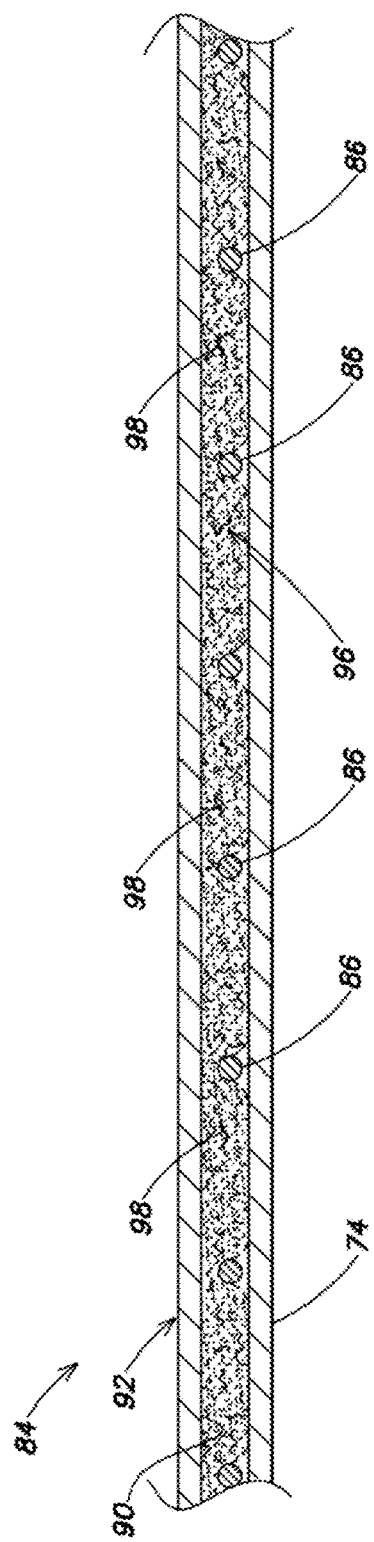

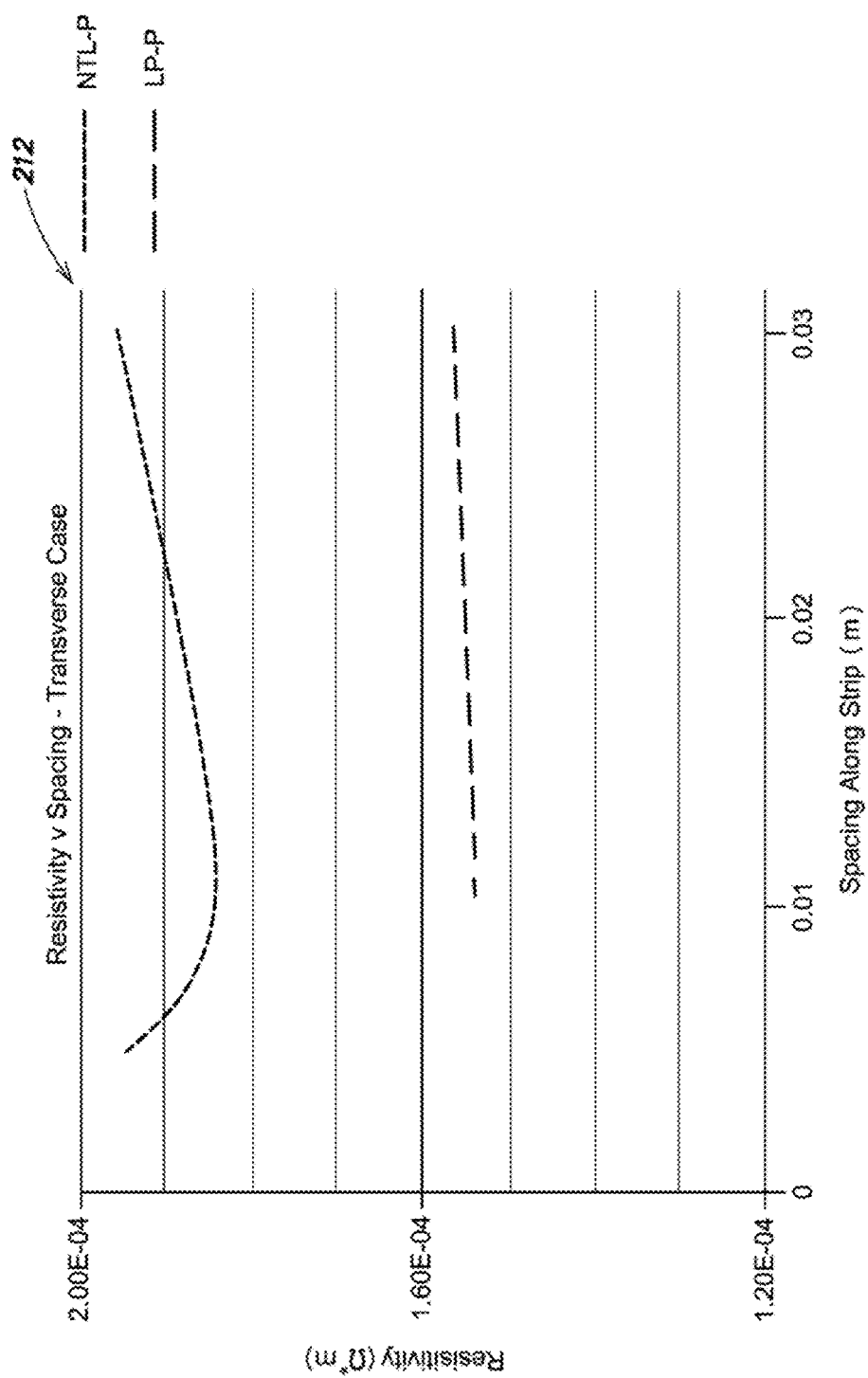

ELECTRODES FOR ELECTROCHEMICAL CELLS

CROSS-REFERENCE TO RELATED APPLICATIONS

This application claims the benefit of my U.S. Provisional Application No. 62/086,836 that was filed 3 Dec. 2014 by Halbert P. Fischel, which was entitled "Electrodes for Electrochemical Cells", and which is also incorporated herein by reference.

The present inventor, Halbert Fischel, has been researching and developing efficient utilization of materials and processes using mechanical engineering, electrical engineering, electrochemistry and fluidics. His early work included use of advanced fluidics in association with rotating microporous membranes for use in diverse fields, including for example "blood fractionation systems", and "hemodialysis systems", as disclosed respectively in U.S. Pat. No. 5,034,135 of 23 Jul. 1991, U.S. Pat. No. 5,376,263 of 27 Dec. 1994, and U.S. Pat. No. 4,366,051 of 28 Dec. 1982. More recently the inventor has been focusing upon advanced fluidics integrated with electrochemical cells, resulting in a series of ten issued patents, so far. Each of those ten patents is associated with a "Case" letter (identified below), and each is incorporated herein by reference thereto. This Non-Provisional Application, identified as Case L, is therefore related to the following patents and patent application of the present inventor, Halbert P. Fischel.

Case A: "Electrochemical Cells Utilizing Taylor Vortex Flows", application Ser. No. 12/800,658 of 20 May 2010, now U.S. Pat. No. 8,017,261 of 13 Sep. 2011.

Case AI: "'Electrochemical Cells Utilizing Taylor Vortex Flows", application Ser. No. 13/194,049 of 29 Jul. 2011, now U.S. Pat. No. 8,283,062 of 9 Oct. 2012, which is a division of application Ser. No. 12/800,658 (Case A); now U.S. Pat. No. 8,017,261 of 13 Sep. 2011.

Case A2: "Galvanic Electrochemical Cells Utilizing Taylor Vortex Flows", application Ser. No. 13/235,480 of 18 Sep. 2011, now U.S. Pat. No. 8,187,737 of 29 May 2012, which is a continuation-in-part of application Ser. No. 13/194,049 (Case A1), now U.S. Pat. No. 8,283,062.

Case B: "Fuel Reformers Utilizing Taylor Vortex Flows", application Ser. No. 12/800,710 of 20 May 2010, now U.S. Pat. No. 8,187,560 of 29 May 2012.

Case C: "Chemical Process Accelerator Systems Comprising Taylor Vortex Flows", application Ser. No. 12/800,657 of 20 May 2010, now U.S. Pat. No. 8,147,767 of 3 Apr. 2012.

Case D: "Direct Reaction Fuel Cells Utilizing Taylor Vortex Flows", application Ser. No. 12/800,672 of 20 May 2010, now U.S. Pat. No. 7,972,747 of 5 Jul. 2011.

Case E: "Dynamic Accelerated Reaction Batteries", application Ser. No. 12/800,709 of 20 May 2010 with additional inventors Philip Michael Lubin and Daniel Timothy Lubin, now U.S. Pat. No. 7,964,301 of 21 Jun. 2011.

Case F1: "Cross-Flow Electrochemical Batteries", application Ser. No. 13/171,080 of 28 Jun. 2011, now U.S. Pat. No. 8,158,277 of 17 Apr. 2012, claiming benefit of U.S. Provisional Patent Application No. 61/388,359 filed 30 Sep. 2010, and of International Patent Application No. PCT/US 10/39885 filed 25 Jun. 2010.

Case G: "Thick Electrode Direct Reaction Fuel Cells Utilizing Cross Flows and Taylor Vortex Flows", application Ser. No. 13/174,686 of 30 Jun. 2011, now U.S. Pat. No. 8,124,296 of 28 Feb. 2012, claiming benefit of U.S. Provisional Patent Application No. 61/388,359 filed 30 Sep. 2010.

Case H: "Galvanic Electrochemical Cells for Generating Alternating Current Electricity", with inventor Sheldon Epstein, application Ser. No. 13/437,771, now U.S. Pat. No. 8,394,518 of 12 Mar. 2013.

Case L: "Electrodes for Electrochemical Cells, provisional application Ser. No. 62/086,836, of which the present application is a non-provisional application thereof, The above patents are incorporated herein by reference thereto.

BACKGROUND OF THE INVENTION

1. Field of the Invention

This disclosure relates to galvanic cells and supercapacitors including electrochemical cells such as electrolysis cells, fuel cells, and batteries, and in particular relates to apparatus and methods for increasing power density of components of galvanic cells and supercapacitors.

2. Description of Related Art

All galvanic cells and supercapacitors that store and/or produce electrical power, comprise three main elements; a positive and negative electrode and an electrolyte that separates them. Everything else exists to accommodate these. Virtually every prior art fuel cell and battery in current literature incorporates the three essential components in a static assembly whereby ions (charged molecules or atoms) move through the electrolyte between electrodes by diffusion. Slow ion diffusion limits power which depends, among other factors, on the rate of ion movement (mass transport) between electrodes.

The electrochemical process for batteries and fuel cells requires polar opposite or oxidation-reduction reactions (hereafter "redox reactions") to occur on the separated surfaces of solid materials in contact with ionic electrolyte. Useful electrical current is not realized to any sensible extent unless three coordinated processes occur simultaneously. 1) Electricity must flow between the material on or in which it is generated and a current collector (usually metal). Ohm's law applies as much to that current as to any other. 2) Electrical current is thermodynamically generated in accordance with Tafel's law characterized in electrochemistry as resistance, i.e., the negative slope of voltage vs. current. 3) Ions having different electrochemical potential are generated at separated electrodes and in the cases of batteries, fuel cells and electrolyzers must physically meet to neutralize one another. The kinematics of ion mass transport can also be characterized as resistance to electrical current. The three resistances, ohmic, ion kinetics and Tafel are connected in series and dominate the performance of galvanic cells. However, supercapacitors are not much restricted by ion kinetics or the Tafel relationship.

Reactions that involve galvanic or direct current occur mainly on solid surfaces or also to some extent below those surfaces. New and emerging material science technology has produced high concentrations of surface area through nanoscale material development. Consequently, electrochemical activity per weight and volume of current producing material is now very high. However, prior art electrochemical architecture imposes very high resistance due to slow diffusion that restricts ion mass transport kinetics and high ohmic resistance between active material and current collector terminals. Both resistances compel low current density, i/cm² limitation on prior art cell electrode design because galvanic material must be spread thin over very large current collector area to achieve total energy storage and target power. That is what dominates cell size, weight and cost.

Prior electrochemical cells cannot operate at reasonable efficiency above 1 amp/cm² or more generally at ½ that. The only way to make a transformational impact on the limitation is to significantly reduce both ion kinetic and electron ohmic resistances simultaneously. When that is achieved it becomes possible to operate the galvanic cell at higher current density with negligible power loss. Batteries use two polar faradaic galvanic materials applied as pastes to metal surfaces containing or immersed in electrolyte and separated by a membrane or electrolyte gap. These materials are only stable in situ under conditions of stationary diffusion but not when exposed to moving electrolyte. Furthermore, pastes must contain conductive additives to support even minimal electrode current density. Stable galvanic coatings of nanoscale substrates (galvanic pellicles) are now possible but these have not been connected to metal current collectors at low ohmic resistance.

A fuel cell is similar except that the particle or surface is a catalyst that does not change its nature to promote a reaction on its surface between fuel or oxygen and electrolyte to produce ions. It may also deal with the complication of a gas phase at its surface. Whether the electrolyte is solid (ionomer) or liquid (e.g., alkali) gaseous fuel must diffuse into electrolyte and become dissolved therein before it is eligible to react on the catalyst surface. That further complicates ion mass transport kinetics since dynamic fuel flow and electrolyte access to catalyst surfaces in a static proton exchange membrane fuel cell (PEMFC) is its own process limitation. But, even if all these issues are solved by convection dynamics, as disclosed in the aforesaid patents, there remains current limiting electrical resistance at the PEM interface with the bipolar plate.

Other electrode combinations of galvanic cell electrodes have been proposed to provide a faradaic battery anode with an air (oxygen) breathing catalytic cathode as a hybrid battery/fuel cell but are not yet realized for high power applications. Water electrolyzers are fundamentally electrolyte convection processes and therefore not amenable to static PEMFC architecture even though the process is an $H_2/O_2$ fuel cell in reverse. Supercapacitors are not limited by ion mass transport kinetics because diffusion path length is limited to 1 nm (Helmholtz plane) from electrolyte exposed surfaces. Yet they continue to be current density limited because of high contact impedance at their interface with metal current collectors.

Prior art has embraced carbon nanotubes, CNT as the ultimate in compact surface structure and inherent low resistance electrical conduction material. It is also the material of choice in this invention. CNT is a graphene molecular structure having $10^{-6}$ ohm-cm resistivity or about half that of silver metal. The molecular structure of graphene is such that electrons or holes move through the nearly transparent structure as a quantum wave rather differently compared to metal conduction band conductivity. Consequently, when electrical charge must move from CNT to metal it encounters significant ohmic resistance in the transition. Conductivity to the metal is not that of CNT even for CNT vertically aligned with one end attached to a metal surface. Prior art electrode architecture has been devoted to harvesting the CNT and using them to form entangled or nonwoven cohesive mats commonly referred to as 'buckypaper'. This form, with CNT coated for various purposes is frequently proclaimed to be a major achievement for batteries, supercapacitors and even fuel cells.

For example, U.S. Pat. No. 8,951,697 that issued on Feb. 10, 2015 to Tsinghua University in Beijing China discloses a "pressed carbon tube film" and other carbon fiber modifications as part of a complex CNT "structure" to resolve the high carbon fiber paper resistance. However, significant reductions in CNT contact resistance is not achieved. Additionally, in U.S. Pat. No. 8,021,747 that issued on Sep. 20, 2011 to Samsung, Inc., concerns are raised about the surface resistivity of CNT layers. This Patent discloses a lot of varying methods of altering porosity and pore volume of CNT layers and teaches solutions to many of current resistivity problems, but again fails to significantly decrease contact resistance of CNT layers. It is also noted that U.S. Pat. No. 8,213,157 that issued on Jul. 3, 2012 to the University of Delaware discloses that surface conductivity of a CNT mat is altered by apparent changes resulting in surface modifications from repeated heating and cooling. However, this Patent also fails to achieve a meaningful reduction in contact resistivity of the CNT mat.

Accordingly, there is a need for an improved electrode that minimizes resistivity to current and that also maximizes available surface area on the electrode for galvanic, faradaic or dielectric functions.

SUMMARY OF THE INVENTION

A key discovery in this invention is that ohmic resistance between a carbon nanofiber ("CNF") or carbon fiber ("CF") mat (referred to herein occasionally collectively as a "galvanic pellicle") over strongly compressed, connected or embedded areas or a continuous connected or embedded area, that compresses or embeds the full thickness of a galvanic pellicle mat onto or into an electrically conductive surface, can be reduced to virtually 0 ohm under the compressed or embedded areas. The structure that virtually eliminates interfacial contact resistance in a preferred embodiment of this invention includes compression or embedding of a full uncompressed thickness of the mat against or into an electrically conductive surface in a limited area pattern. This leaves a somewhat pillowed effect on uncompressed (unconnected) areas, or on areas surrounded by a continuous connected area, such as a compression screen. A core aspect of the invention is that the connected areas and the segments of the continuous connected areas are positioned so that any point within any uncompressed section is no more distant from one of a nearest connected area and a nearest segment of a continuous connected area than about ten times an uncompressed thickness dimension of the galvanic pellicle, and optionally between about a quarter of and about ten times the uncompressed thickness dimension. It has been found that with this structure, it is not necessary to cover more than ten percent of the outer surface of the galvanic pellicle or mat with any solder or other structures, such as connectors, to form the connected areas or continuous connected area.

More specifically, this disclosure includes electrodes for electrochemical cells, wherein the electrode includes an electrically conductive surface, a galvanic pellicle having a first surface and an opposed outer surface. The galvanic pellicle also has an uncompressed thickness dimension which is a longest distance of a straight axis extending from a position normal to the first surface of the galvanic pellicle to contact the outer surface of an uncompressed section of the galvanic pellicle. The galvanic pellicle is secured to the electrically conductive surface so that the first surface of the galvanic pellicle is adjacent the electrically conductive surface. The galvanic pellicle is secured to the electrically conductive surface by at least one of; a plurality of connected areas; and, a continuous connected area. Uncompressed sections of the galvanic pellicle are also defined between at least one of the plurality of connected areas; and between contiguous segments of the continuous connected area of the galvanic pellicle. The plurality of connected areas and the segments of the continuous connected areas are also positioned so that any point within any uncompressed section is no more distant from one of a nearest connected area and a nearest segment of a continuous connected area than about ten times the uncompressed thickness dimension of the galvanic pellicle. (For purposes herein, the word "about" is to mean plus or minus ten percent.)

It is essential that means for strongly compressing or embedding a plurality of connected areas or a continuous connected area not penetrate or cut through the galvanic pellicle. Consequently, the smallest projected areal dimension of compression or embedding means connecting a plurality of separate areas or a segment of a continuous area to the electrically conductive surface may not be less than one fourth to twice the thickness of the uncompressed thickness dimension of the pellicle.

In another aspect of the disclosure of the electrode for electrochemical cells, the galvanic pellicle includes at least one of; a cohesive mat of nonwoven single-walled carbon nanotubes; a cohesive mat of nonwoven multi-walled carbon nanotubes; a plurality of layers of multilayer graphene sheets; single-walled carbon nanotubes grown on woven carbon fiber; multi-walled carbon nanotubes grown on woven carbon fiber; and combinations thereof.

In a further aspect of the disclosure, the uncompressed sections of the electrode include at least about ninety percent of the outer surface of the galvanic pellicle. Additionally, at least one of the plurality of connected areas, and the continuous connected area define compressed portions of the galvanic pellicle compressed between the connected areas and the electrically conductive surface so that the compressed portions of the galvanic pellicle include less than about ten percent of the outer surface of the galvanic pellicle.

In a further embodiment of the electrode for electrochemical cells, at least one of; any of the plurality of connected areas, and any point on the continuous connected area, have an ohmic resistance between the first surface of the galvanic pellicle and the adjacent electrically conductive surface characterized by an experimentally measured parameter of 0.000004 ohm-square centimeter whenever at least one of the plurality of connected areas and the electrically conductive surface are compressed together, and the continuous connected area and the electrically conductive surface are compressed together, by a compressive force of at least 28,000 Newtons per square centimeter, and whenever the plurality of uncompressed sections remain uncompressed onto the conductive surface by being exposed to a compressive force no greater than 0.69 Newton per square centimeter. To calculate the ohmic resistance of a particular projected electrode area one divides the stated parameter by the actual connected area. For example; if only 10% of the area in 1 square centimeter is actually connected, the ohmic resistance of that 1 cm$^2$ is 0.000004 (ohm-cm$^2$)/0.1(cm$^2$)=0.00004 ohm.

In yet another aspect of the electrode for electrochemical cells, at least one of; the plurality of connected areas, and the continuous connected area of the galvanic pellicle is at least one of; compressed by a connector against the electrically conductive surface to restrict removal of the galvanic pellicle from the surface when exposed to an extraction force of liquids of about 1 centipoise viscosity flowing through or over the pellicle at a rate of up to about 1 cm/second; and, embedded by a removable forming tool so that the full thickness of the compressed pellicle material remains embedded within the electrically conductive surface to restrict removal from the surface when exposed to an extraction force of liquids of about 1 centipoise viscosity flowing through or over the pellicle at a rate of up to about 1 cm/second; and, embedded by the connector within the electrically conductive surface to restrict removal from the surface when exposed to an extraction force of liquids of about 1 centipoise viscosity flowing through or over the pellicle at a rate of up to about 1 cm/second.

In an additional embodiment of the electrode, the galvanic pellicle defines at least one of; open, connected (sponge-like) through-flow pores, and closed (foam-like) pores to allow normal vector fluid electrolyte permeation at greater than about 0.1 Darcy.

In a further aspect of the electrode, the galvanic pellicle within the plurality of connected areas is compressed by a connector against the electrically conductive surface by pressure exceeding 6,894 Newtons per square centimeter. Alternatively, the galvanic pellicle within at least one of; the plurality of connected areas, and the continuous connected area is compressed by a connector against the electrically conductive surface by pressure exceeding 68,947 Newtons per square centimeter.

In another embodiment of the electrode, the galvanic pellicle includes open pores to be porous and the conductive surface is also a porous electrically conductive metal surface. A second porous, electrically conductive metal surface includes a contact surface and an opposed support surface wherein the contact surface of the second, porous electrically conductive metal surface is secured adjacent the outer surface of the galvanic pellicle. The second porous, electrically conductive metal surface includes a second porous galvanic pellicle secured to the support surface of the second electrically conductive metal surface. The two metal surfaces and the two galvanic pellicles are secured sufficiently to each other to form a composite porous sheet electrode that is able to accommodate about 1 centipoise viscosity electrolyte normal vector flow through the composite porous sheet electrode at greater than about 0.1 Darcy permeability and with at least 1 cm/second convection velocity without separation of the supports and galvanic pellicles forming the composite porous sheet electrode. (For purposes herein, "permeability shall mean the pressure gradient in atmospheres (atm.) required to flow liquid having 1 centipoise viscosity at velocity, v through the face of a 1 cm cube of material. At 1 atm. and 0.1 cm/sec the permeability is 0.1 Darcy. 1 Darcy means the flow rate is 1 cm/sec at the same pressure gradient because these relationships are linear at low velocities.)

In another aspect of the present electrode, surfaces of graphene within the galvanic pellicle are coated with galvanic materials. Additionally, particles of galvanic material having diameters in a range of 0.5 µm to 5 µm are configured to remain encapsulated and immobilized within graphene structures on the graphene sheets when subject to electrolyte convection flow of up to about 1 cm/sec. Further, the galvanic materials encapsulated and immobilized within the galvanic pellicle may be catalysts promoting redox electrochemical reactions. Alternatively, the galvanic materials encapsulated and immobilized within the galvanic pellicle may be faradaic catalysts promoting redox electrochemical reactions.

In a further embodiment of the electrode for electrochemical cells, the connected areas are in the form of a woven screen compressing the galvanic pellicle against the electrically conductive surface. The woven screen may also include a weave defining a plurality of open squares or windows that make up greater than about 60% to about 75%, and preferably about 65%, of the projected window area defined by the woven screen. The open squares define the uncompressed sections of the galvanic pellicle. Additionally, wires making up the woven screen may be made of materials being one of a metal material and a dielectric material.

In an additional aspect of the electrode for electrochemical cells, connectors within the connected areas include projections extending into the galvanic pellicle from a villiform surface defined on the electrically conductive surface. Projections from the villiform or continuous raised pattern surface of a removable hardened tool can be pressed into the galvanic pellicle to embed its full thickness into the metal electrically conductive surface.

In a further aspect of the disclosure, the galvanic pellicle of the electrode has an uncompressed thickness dimension that is between about 1.0 micrometer and about 1.0 millimeter.

In yet an additional aspect of the disclosure, the electrically conductive surface is a metal sheet having a first electrically conductive surface and an opposed second electrically conductive surface. The second electrically conductive surface also has a second galvanic pellicle secured to the second electrically conductive surface, and the second galvanic pellicle is one of a second galvanic pellicle having a polarity distinct from the polarity of the first galvanic pellicle, and a second galvanic pellicle having a polarity identical to the polarity of the first galvanic pellicle. Polarity depends on the electrochemical potential (e.g., electronegativity) of the faradaic material or catalyst ($O_2$ reducer or fuel oxidizer) coating or entrained within the carbonaceous structures of the galvanic pellicle.

In another aspect of the disclosure, a plurality of additional electrodes are stacked in a cooperative functional relationship with each other, such as in a fuel cell, an electrolysis cell, a battery, a supercapacitor, etc.

In an additional aspect of the electrode, the continuous connected areas are in the form of a compression-stitched pattern, wherein the pattern defines the uncompressed sections between segments of a compression-thread of the pattern. The compression-thread pattern may be formed by a sewing means for producing the compression-stitched pattern. The sewing means may include a traditional industrial sewing machine which causes a compression thread to force the galvanic pellicle against the electrically conductive surface. Also, a bobbin-tension thread of the sewing machine is adjacent a support surface opposed to the electrically conductive surface loops around the compression thread at needle-holes within the conductive surface and applies tension that resolves into a compression force upon the compression-thread to compress the compression-thread against the galvanic pellicle and to thereby compress the galvanic pellicle against the electrically conductive surface. Additionally, at least one of the compression-thread and the bobbin-tension thread are made of at least one of a single strand metal wire, a braided wire, a three strand braided wire, and a para-aramid synthetic fiber. Additionally, the compression-thread must have a diameter not less than one fourth and preferably not greater than twice the galvanic pellicle thickness so as not to penetrate or cut the pellicle.

In a further aspect of the disclosure, the galvanic pellicle defines a plurality of through-flow open pores, and also defines a plurality of closed pores.

In an additional aspect of the disclosure, the electrically conductive surface is a metal that is at least one of a solid structure, a porous structure, a sheet structure, a pure metal, a metal alloy, a plated metal, and combinations thereof.

In another aspect of the disclosure, at least one of the plurality of connected areas, and the continuous connected area, are positioned so that any point within the uncompressed sections between the at least one of the connected areas, and segments of the continuous connected area, is no more distant than about ten times the uncompressed thickness dimension of the galvanic pellicle from one of; a nearest connected area, and a nearest segment of the continuous connected area. Alternatively, at least one of; the plurality of connected areas, and the continuous connected area, are positioned so that any point within the uncompressed sections between at least one of; the connected areas, and segments of the continuous connected area, is no more distant than about one-quarter of the uncompressed thickness dimension of the galvanic pellicle from one of; a nearest connected area, and a nearest segment of the continuous connected area.

In another embodiment of the disclosure, the outer surface of the galvanic pellicle is at least one of; compressed onto the electrically conductive surface within the connected areas, and compressed or permanently embedded into the electrically conductive surface within the connected areas.

In a further embodiment of the disclosure, the electrode is a first electrode, and the disclosure also includes at least one of a virtually identical second electrode and the two electrodes being distinct based upon their respective pellicle CNT coating materials. The first electrode forms a positive electrode within a supercapacitor, and the second electrode forms a negative electrode within the supercapacitor. Also, an electrolyte permeable dielectric separator having opposed first and second outer surfaces is secured between the first and second electrodes so that the outer surface of the galvanic pellicle of the first electrode is adjacent the first outer surface of the separator, and so that an outer surface of a galvanic pellicle of the second electrode is adjacent the opposed second surface of the separator. Additionally, the separator overlies and extends beyond perimeters of the first and second electrodes to prevent direct contact between the first and second electrodes. The conductive surface of the first electrode is secured in electrical communication with a positive terminal of the supercapacitor, and a conductive surface of the second electrode is secured in electrical communication with a negative terminal of the supercapacitor. Also, the first electrode, the electrolyte permeable dielectric separator, and the second electrode are secured in a supercapacitor casing out of which the positive and negative terminals extend in electrical isolation from each other.

In a further embodiment, the electrode is secured within an electrochemical cell configured so that the electrode is exposed to movement of a convection electrolyte.

Consequently, it can be seen that electrical current producing electrochemical reactions are concentrated by a novel connection of state of the art nanoscale reactants to electrode current collecting conductive surfaces and incorporated as fundamental components of the present electrode for electrochemical cells. As described above, reactant structures are in the form of electrolyte permeable cohesive mats comprising carbon single and multi-walled nanotubes (CNT and MWCNT), graphene layers or woven fibers on which CNT is grown. Carbon surfaces may be uncoated or coated with faradaic or catalytic material as the most electrochemically active electrode materials. These mats are frequently used in galvanic electrodes as sheets, or pellicles sometimes referred to as "buckypaper".

Prior art composite structures do not have internal electrical conductivity, either normal through or within the plane of a sheet or mat, remotely approaching that of graphene carbon from which they are made. Even worse in prior art structures is a high ohmic contact resistance of the sheet at its interface with a metal current collector to which it must be connected. Nor are the sheets as normally supplied easily permeable to electrolyte.

In place of prior art electrodes immersed in or saturated with stagnant electrolyte behind mostly impermeable membranes, with the above-described present electrodes for electrochemical cells, convection electrolyte may flow rapidly through and/or over electrode surfaces while penetrating pellicle voids in order to speed current producing chemical reactions. Prior art carbonaceous mats such as described above e.g., buckypaper, are not normally easily permeable to electrolyte because they have not previously been used in that galvanic electrochemical regime. The present inventive development of galvanic architecture provides for a composite electrode structure that has low internal impedance, is porous, is minimally resistant to electrolyte flow and is also very stable, meaning tolerant of electrolyte convection regarding material retention.

The dramatically improved performance of the electrochemical cells using the electrodes of this invention includes their ability to provide an order of magnitude higher current density than exists in prior art. Prior art current density is about ¼ to ½ amp/cm$^2$ and rarely as high as 1 amp/cm$^2$ operated for actual power delivery. Electrochemical cells using the electrodes of the present invention are capable of producing area current density in terms of 10 or more amps/cm$^2$, which is made possible by use of the electrodes with convection electrolytes and by the unprecedented low impedance of the present electrodes.

Accordingly, it is a general object of the present disclosure to provide an electrode for electrochemical cells that overcomes deficiencies of the prior art.

It is a more specific object of the present disclosure to provide an electrode for electrochemical cells that minimizes contact resistance between a galvanic pellicle and an adjacent electrically conductive surface; that provides an electrode having a galvanic pellicle secured with sufficient durability to an adjacent electrically conductive surface to deter separation of electrode components and/or loss of galvanic materials within the galvanic pellicle while a convection electrolyte is passing through and adjacent the electrode; and, that provides an electrode that achieves these objects while being manufactured with a variety of components and connecting structures and methods.

These and other objects and values of the present disclosure will become apparent in the following detailed description and the accompanying drawings.

BRIEF DESCRIPTION OF THE
ACCOMPANYING DRAWINGS

Figure 4:
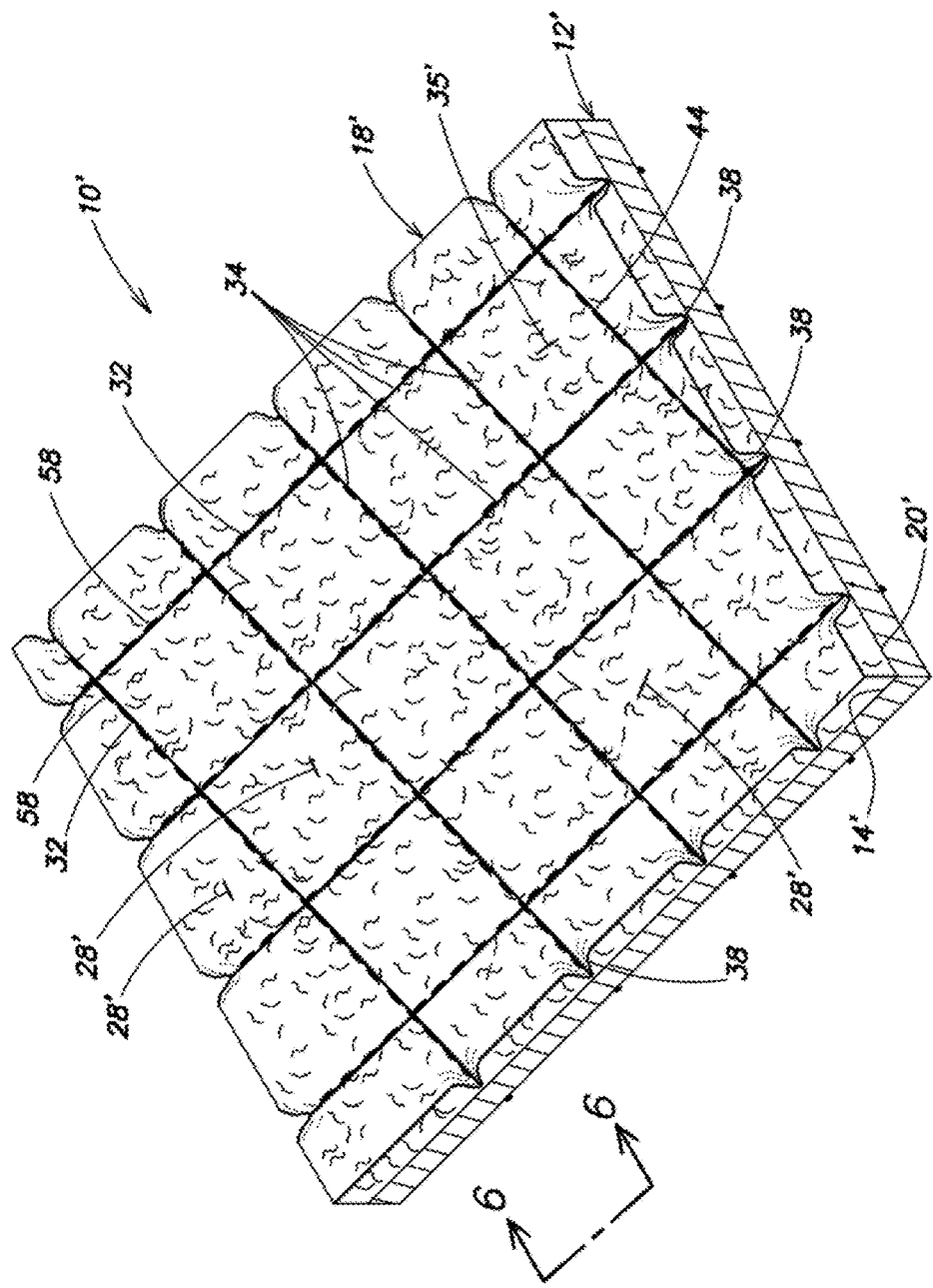
FIG. 4 is a raised perspective view of a section of a second electrode for electrochemical cells constructed in accordance with the present invention and showing a continuous connected area in the form of a compression-stitched pattern and showing uncompressed sections between segments of compression-thread of the pattern.
Figure 6:
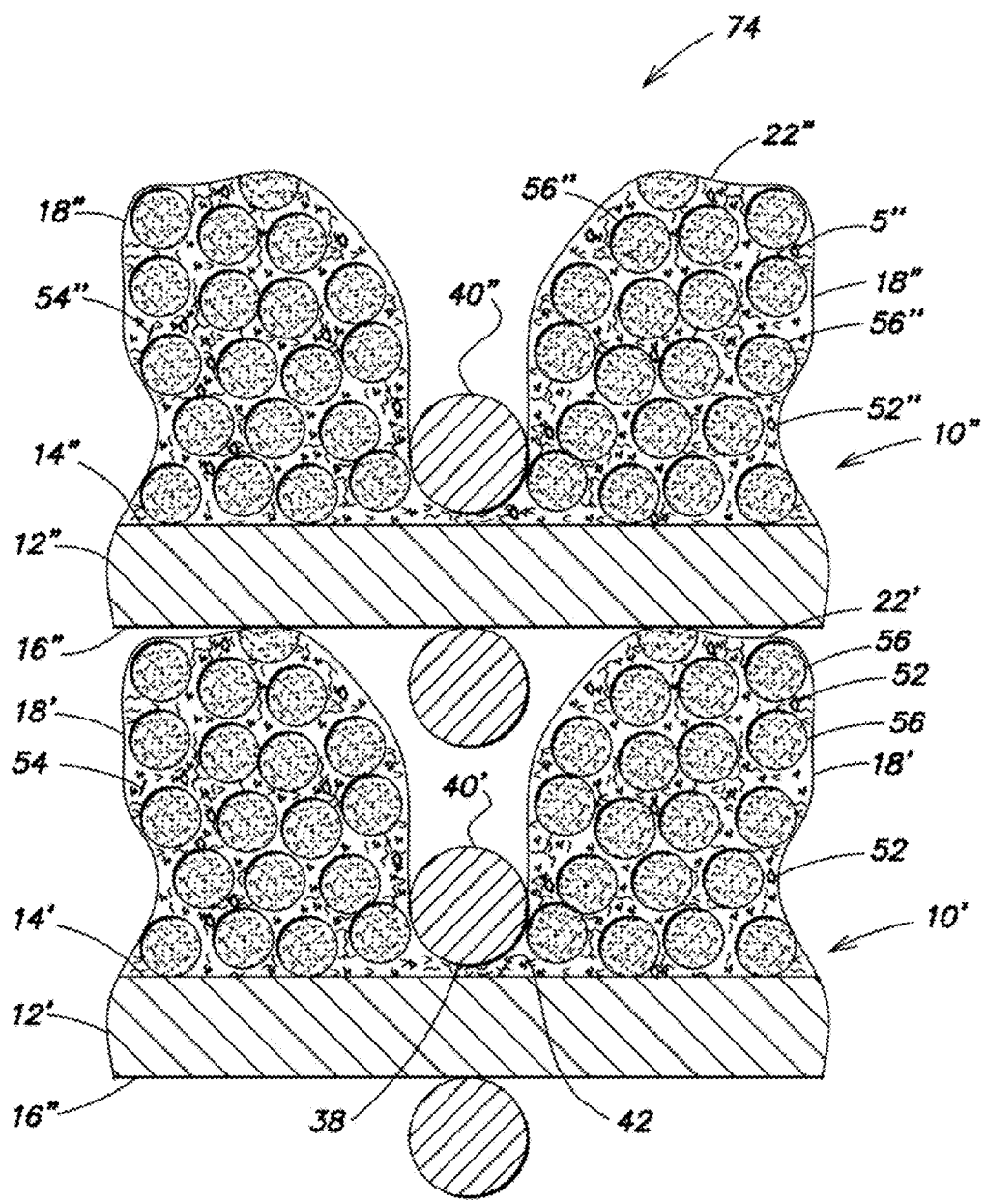

FIG. 6 is a fragmentary side view of the second electrode and a third electrode of the present invention, wherein the second electrode is shown along sight lines 6-6 of FIG. 4, and the third electrode is shown stacked on the second electrode in a cooperative functional relationship, and showing in each of the second and third electrodes a compression-thread compressing a section of a galvanic pellicle onto an electrically conductive surface of a porous metal wire cloth, showing a bobbin-tension thread adjacent an opposed surface of the porous metal wire cloth, and showing a plurality of closed pores within the galvanic pellicle.

Figure 7:
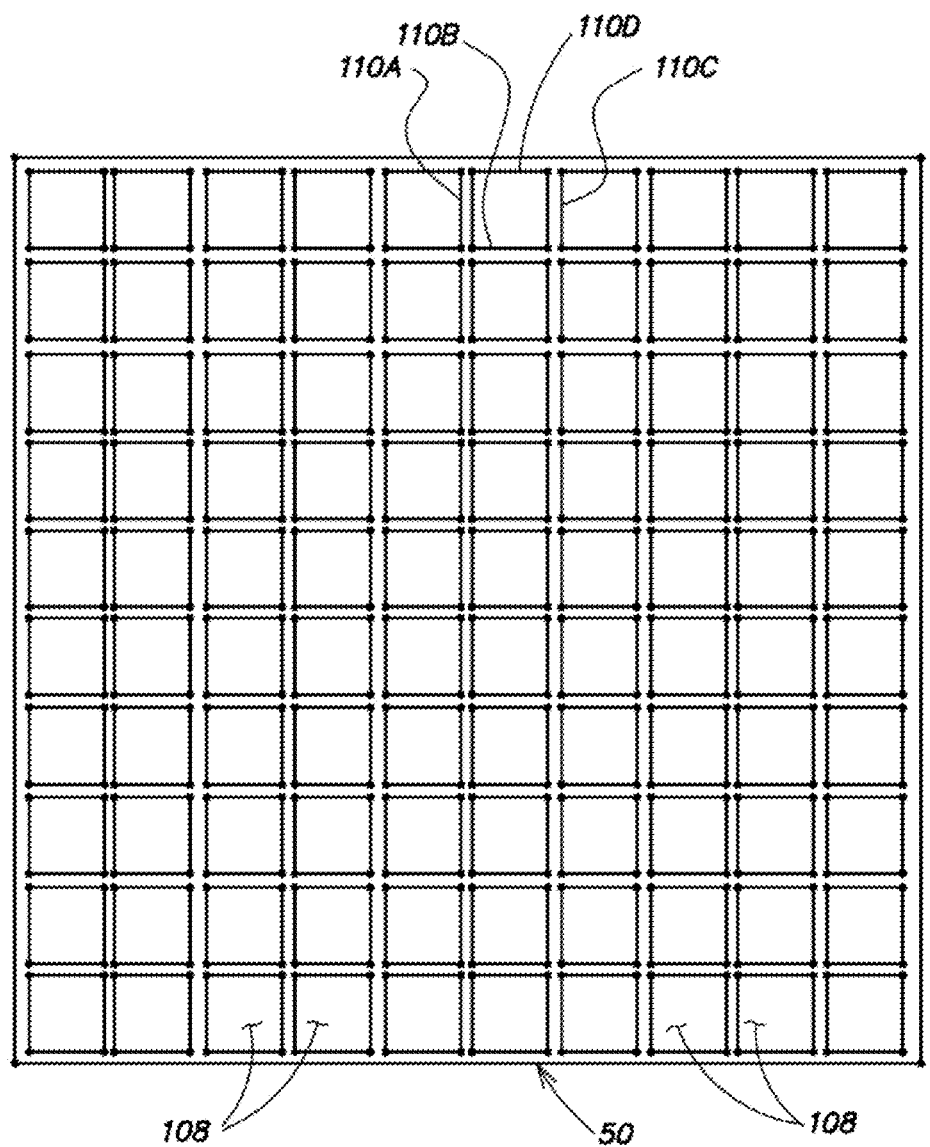

FIG. 7 is a simplified schematic top plan view of a planar, rigid compression screen or the raised ridges of a pellicle embedding removable forming tool appropriate for use with an electrode of the present invention and showing a continuous connected area formed by the rigid screen or forming tool raised ridges that defines areas for uncompressed sections of an electrode between contiguous segments of the screen or forming tool.

Figure 8:
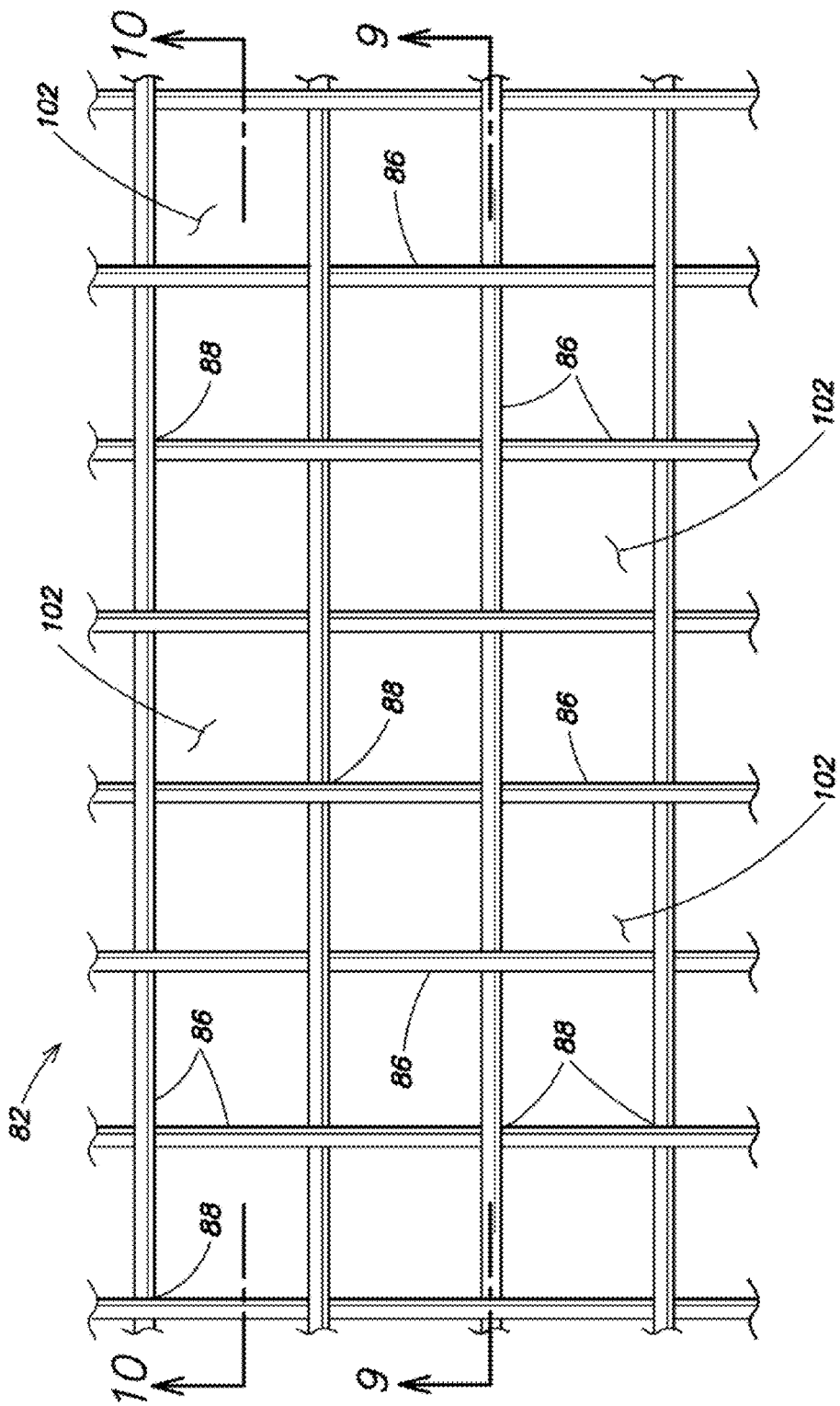

FIG. 8 is a top plan sectional view of a woven screen segment forming connected areas of a third electrode of the present invention.

FIG. 9 is a fragmentary side view of the FIG. 8 woven screen segment taken along sight lines 9-9 of FIG. 8, and also showing an electrically conductive surface of a first metal support and a galvanic pellicle of the third electrode above the woven screen segment, and a second metal support below the woven screen segment.

FIG. 10 is a fragmentary side view of the FIG. 8 woven screen segment taken along sight lines 10-10 of FIG. 8, and also showing the electrically conductive surface of the first metal plate and a galvanic pellicle of the third electrode above the woven screen segment, and as second metal support below the woven screen segment.

Figure 11:
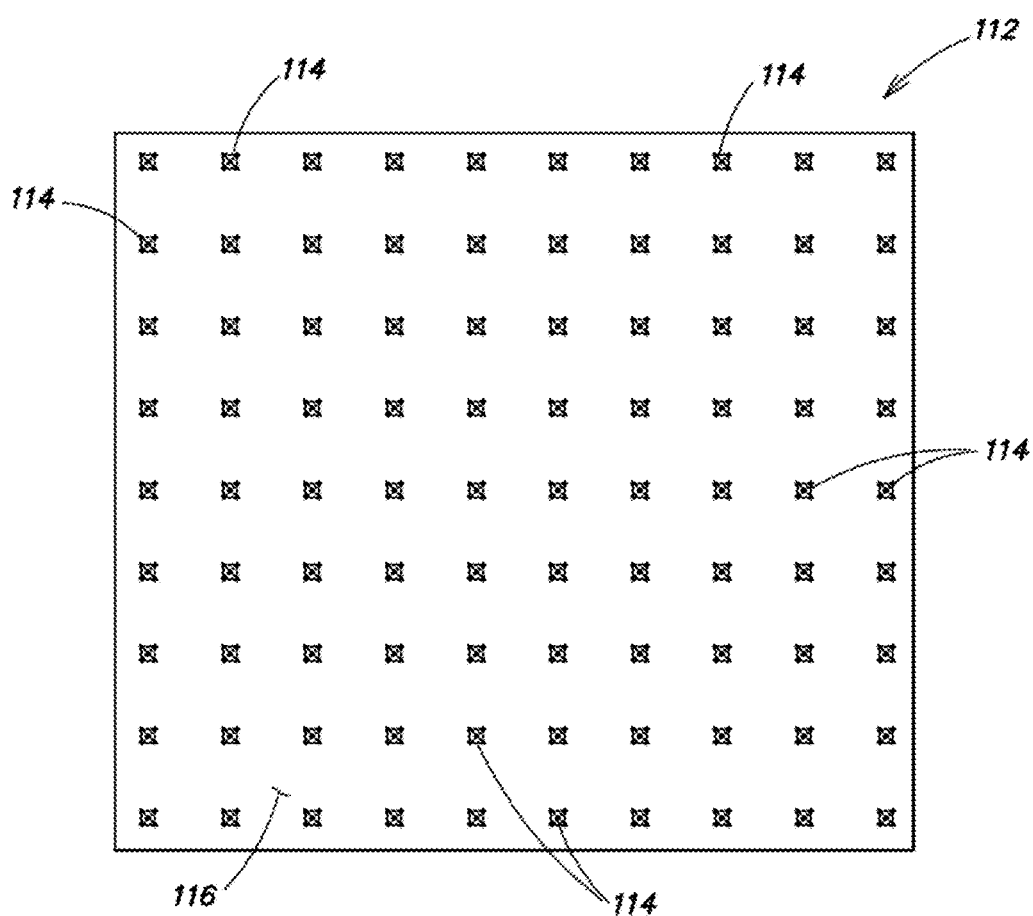

FIG. 11 is a top plan view of an electrode for electrochemical cells constructed in accordance of the present invention and showing a first or square pattern of connected areas and showing individual connected areas having no particular shape or size to be inferred from the figure. The first pattern is also one possible pattern for individual raised villi of a pellicle embedding removable forming tool.

Figure 12:
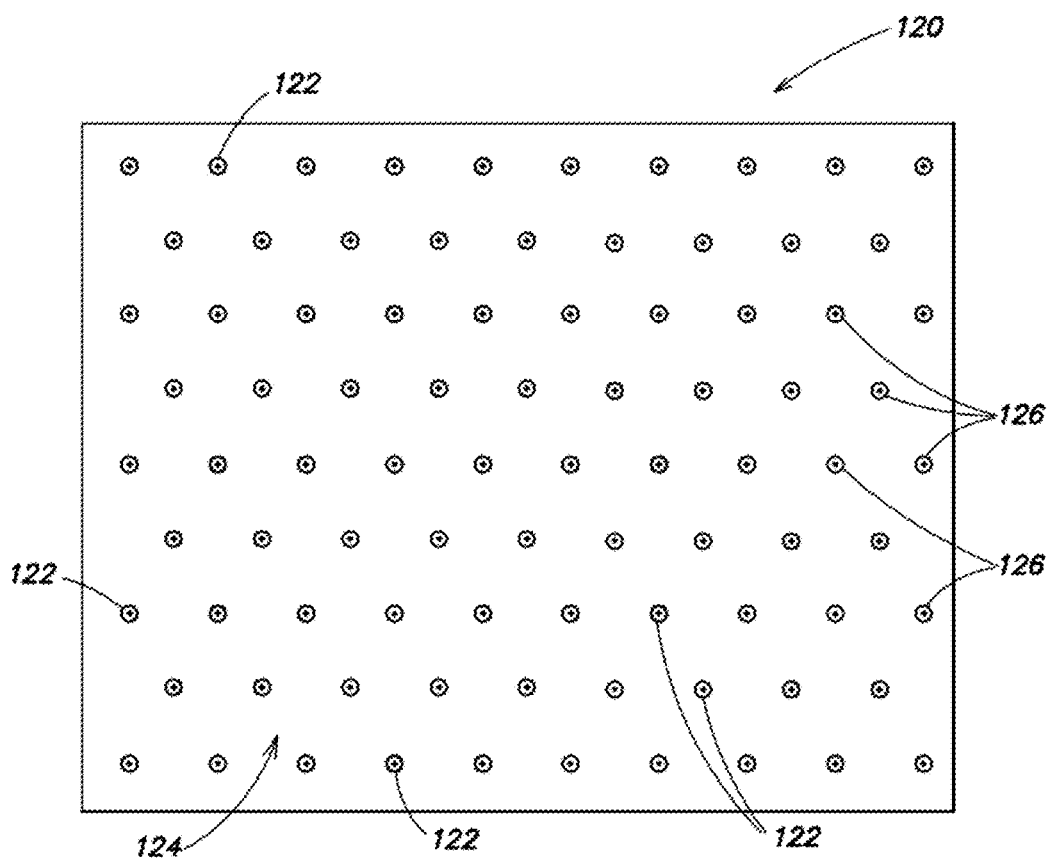

FIG. 12 is a top plan view of an electrode for electrochemical cells constructed in accordance with the present invention and showing a second or hexagonal pattern of connected areas and showing individual connected areas having no particular shape or size to be inferred from the figure. It is also one possible pattern for individual raised villi of a pellicle embedding removable forming tool.

Figure 13:
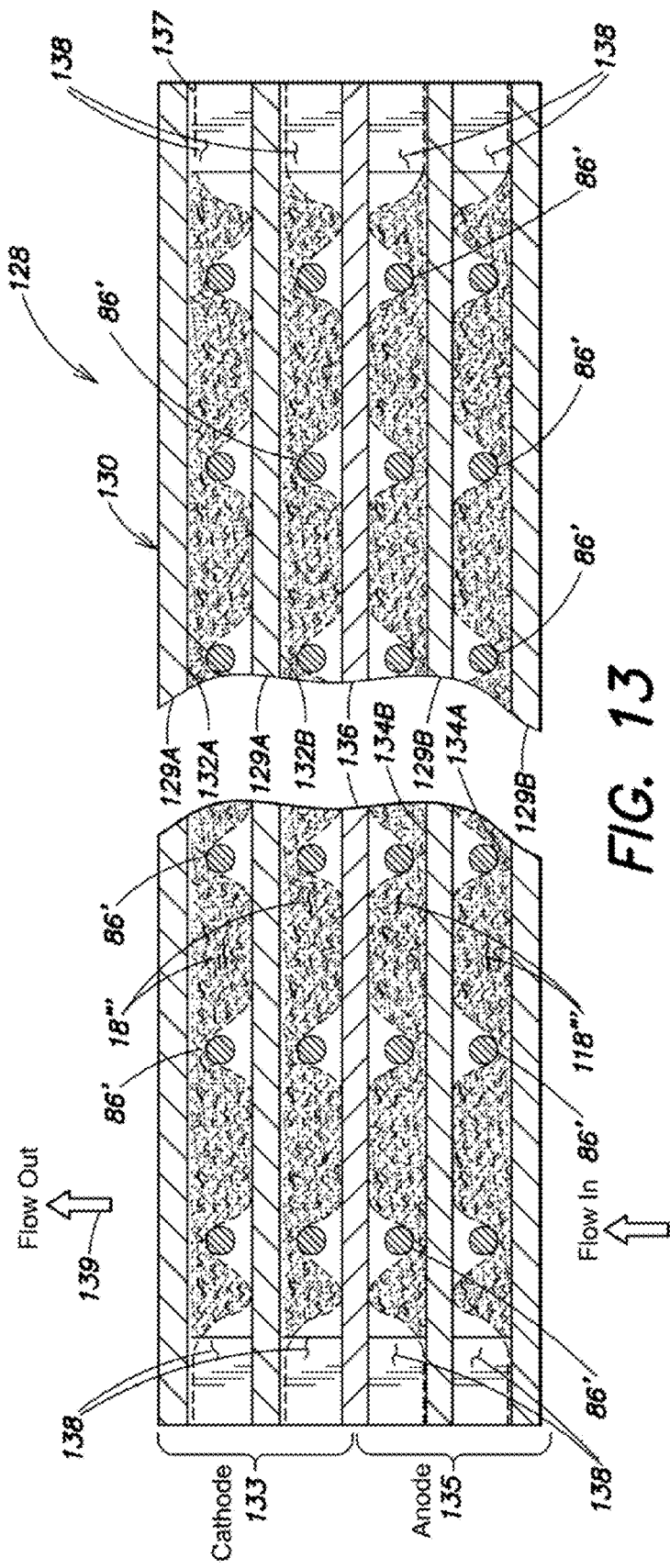

FIG. 13 is a cross-sectional, fragmentary side view of a plurality of electrodes of the present invention stacked together in a cooperative functional relationship to form a core of an electrochemical cell, such as a battery or fuel cell.

Figure 14:
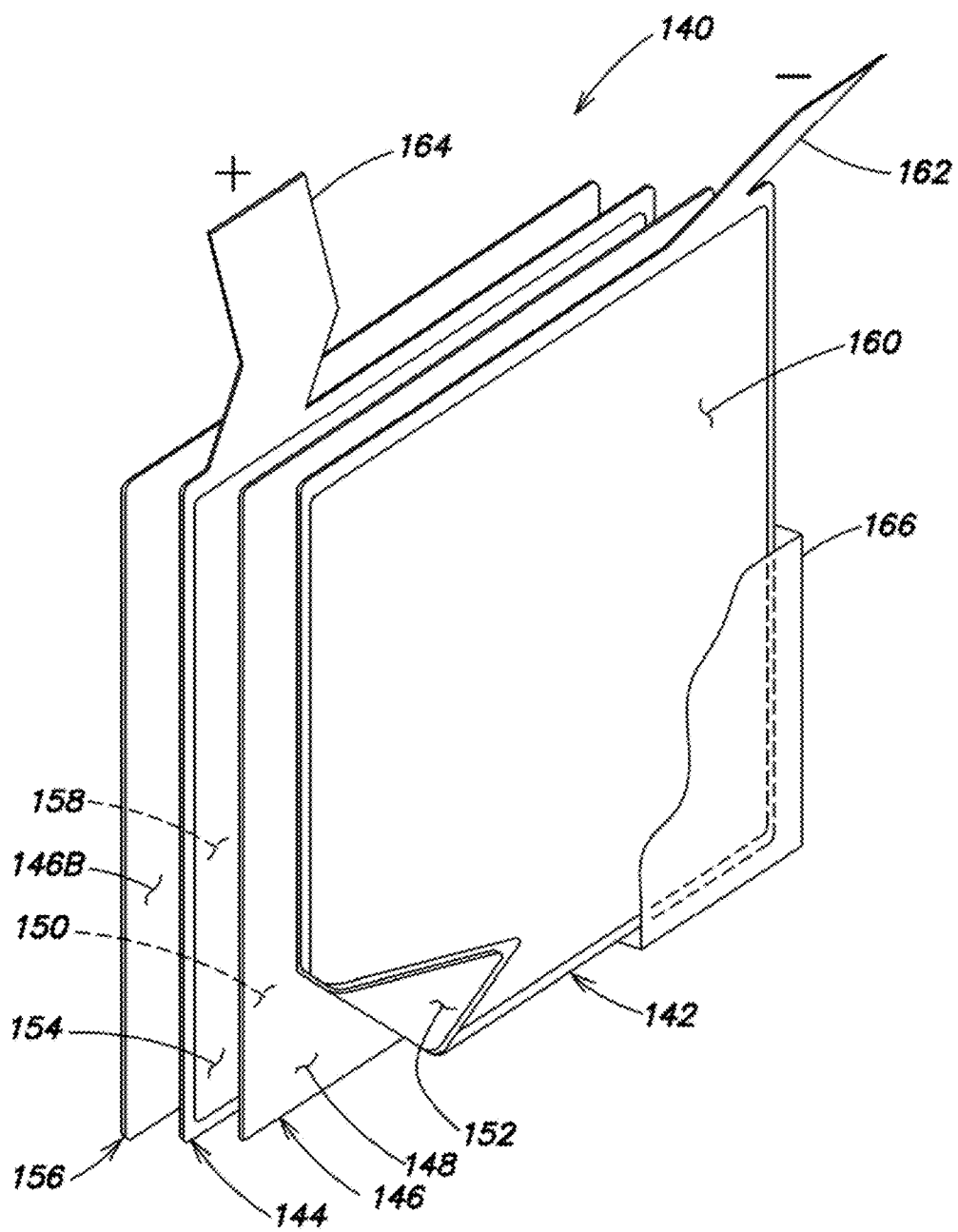

FIG. 14 is a simplified schematic view of two electrodes constructed in accordance in the present invention and disposed within a supercapacitor.

Figure 15:
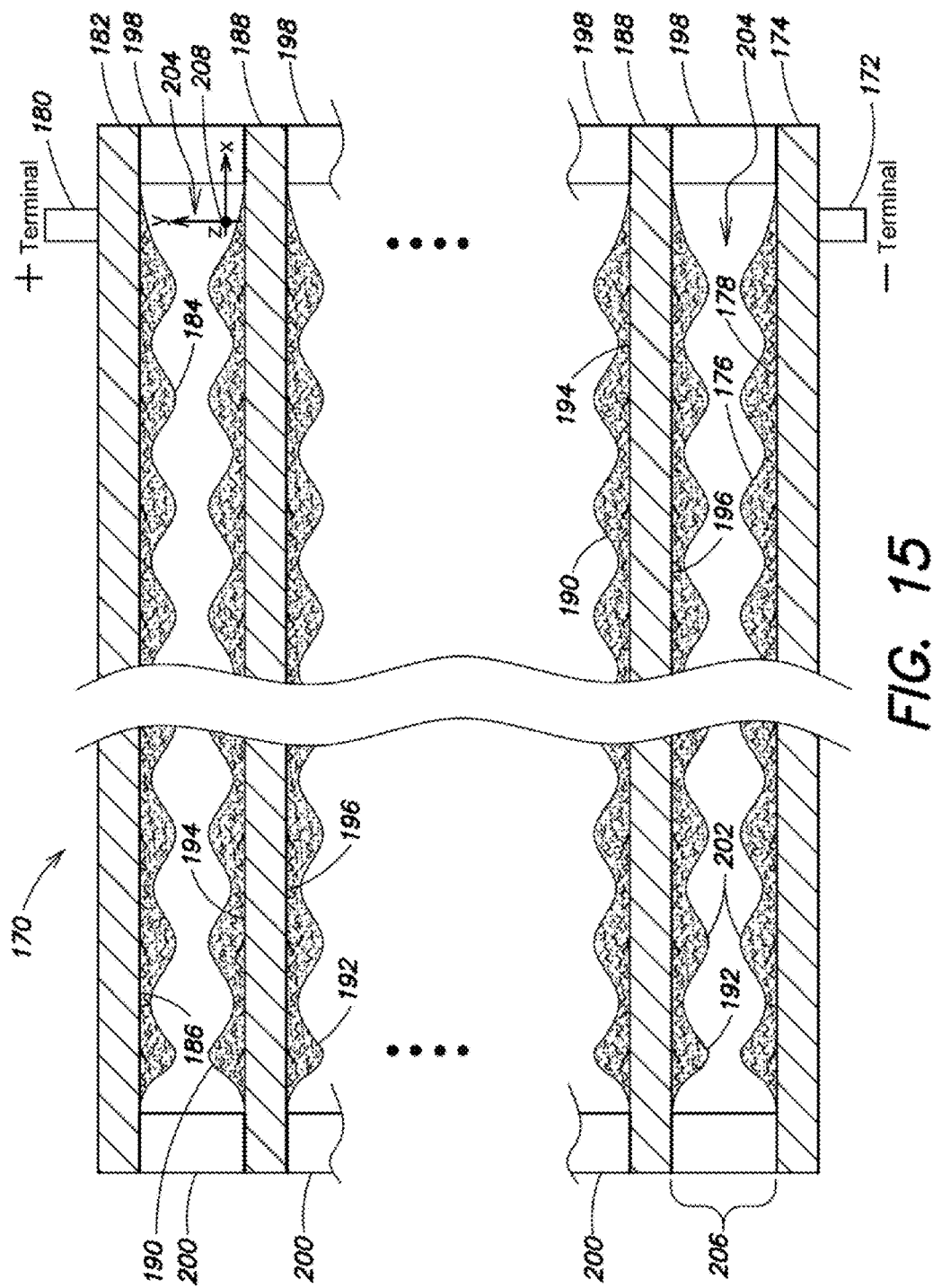

FIG. 15 is a cross-sectional, fragmentary side view of a plurality of electrodes of the present invention stacked together in a cooperative functional relationship to form a core of a second electrochemical cell.

Figure 16:
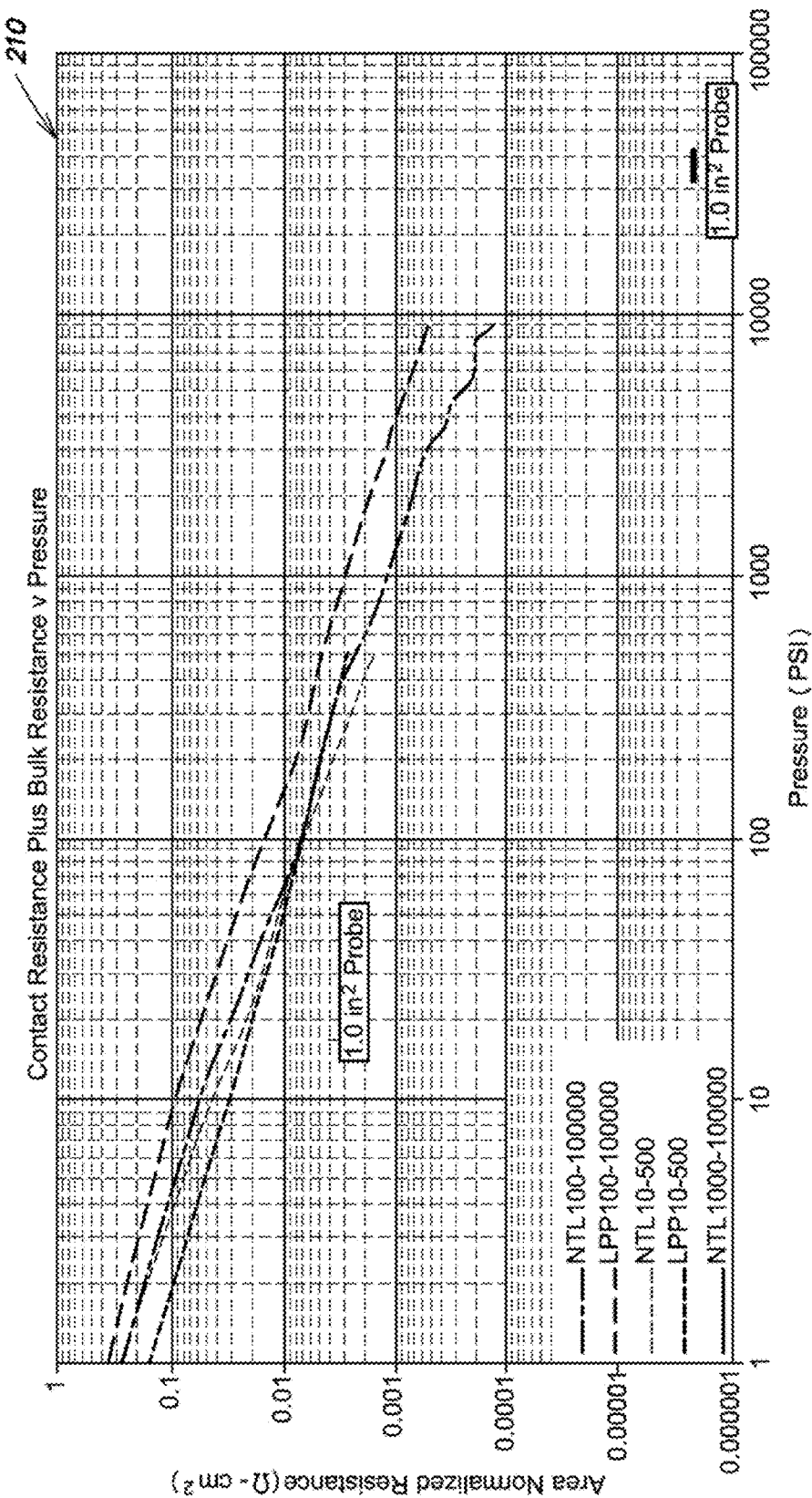

FIG. 16 is a chart showing plots of data comparing contact bulk resistance as a function of pressure applied to force a galvanic pellicle onto an electrically conductive surface of an electrode of the present invention.

FIG. 17 is a chart showing plots of data comparing resistivity as a function of spacing between contact areas of an electrode of the present invention.

DETAILED DESCRIPTION

Figure 1:
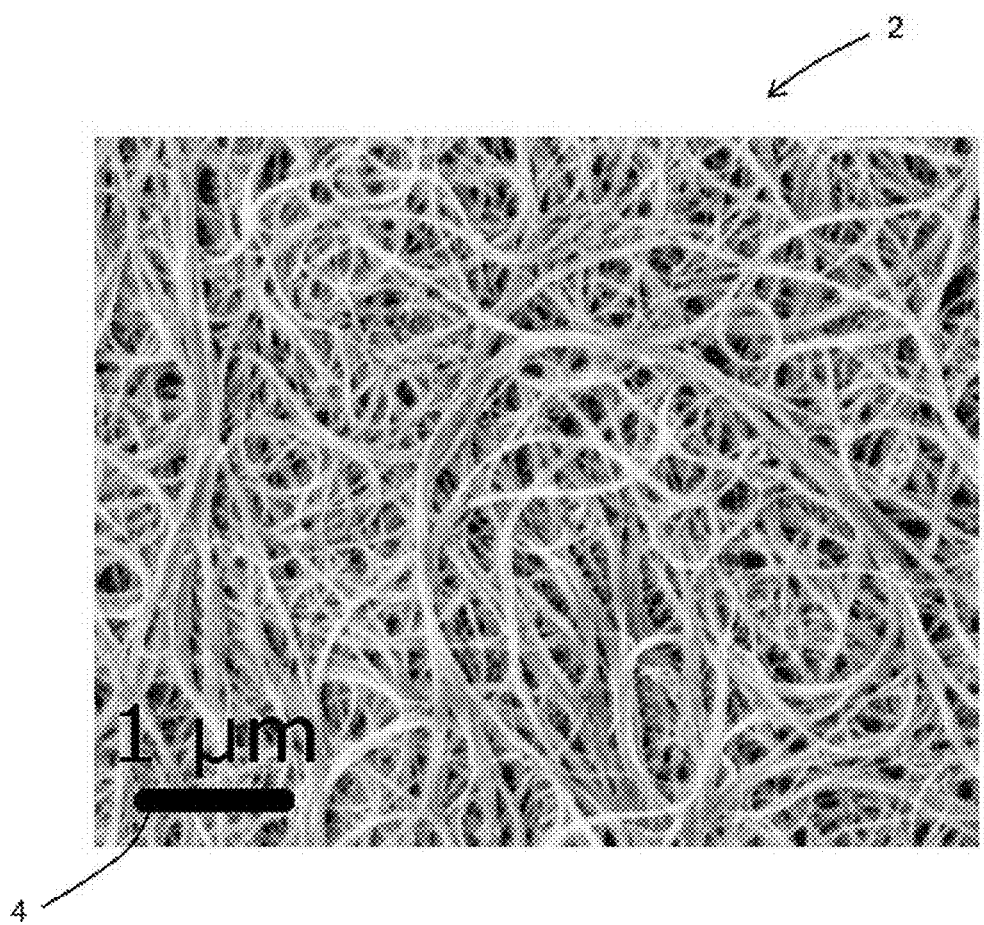
FIG. 1 is a Scanning Electron Microscope (SEM) image of a carbon nanotube bundle having a surface area of about 1,500 square meters per gram, a bulk density of 0.107 gram per cubic centimeter and having a 1.0 micrometer (µm) scale superimposed upon the image.

For purpose of clarity, FIG. 1 shows a scanning electron microscope image of a bundle of carbon nanotubes 2 because carbon nanotubes 2 are a key aspect of this disclosure and form a primary component of most embodiments of the present invention. Carbon nanotubes 2 are well known, but the FIG. 1 image serves to clarify their structure, size, and enormous surface area per unit of mass. FIG. 1 has superimposed on the SEM image a 1.0 micrometer scale 4 that helps one understand how a surface area as great as 1,500 square meters per gram can be achieved. It is a critical aspect of this disclosure that the inventor has dramatically reduced electrical contact resistance of carbon nanotubes 2 transferring electrical current into an adjacent conductive surface, which is shown in the subsequent FIGS. 1-6.

A first electrode of the present invention is shown best in FIGS. 2, 3, 4 and 6 and is generally designated by reference numeral 10. While the electrode is suitable for use in a variety of electrochemical cells, including fuel cells, electrolysis cells, galvanic batteries, and also including supercapacitors etc., it is understood that electrochemical cells are well known in the prior art, and hence no detailed electrochemical cell is included in the accompanying drawings. A suitable electrochemical cell for use of the present electrode 10 is shown in the inventor's above referenced U.S. Pat. No. 8,283,062 at FIG. 1A in that Patent. In particular, an electrode at reference numeral 34 in that Patent is also shown in FIG. 1A. For purposes of efficiency and of showing use of the present electrode 10 in an electrochemical cell, the aforesaid U.S. Pat. No. 8,283,062 is hereby incorporated herein by reference thereto for that purpose. A simplified electrochemical cell is shown in FIG. 13 at reference numeral 130 and described below.

Figure 2:
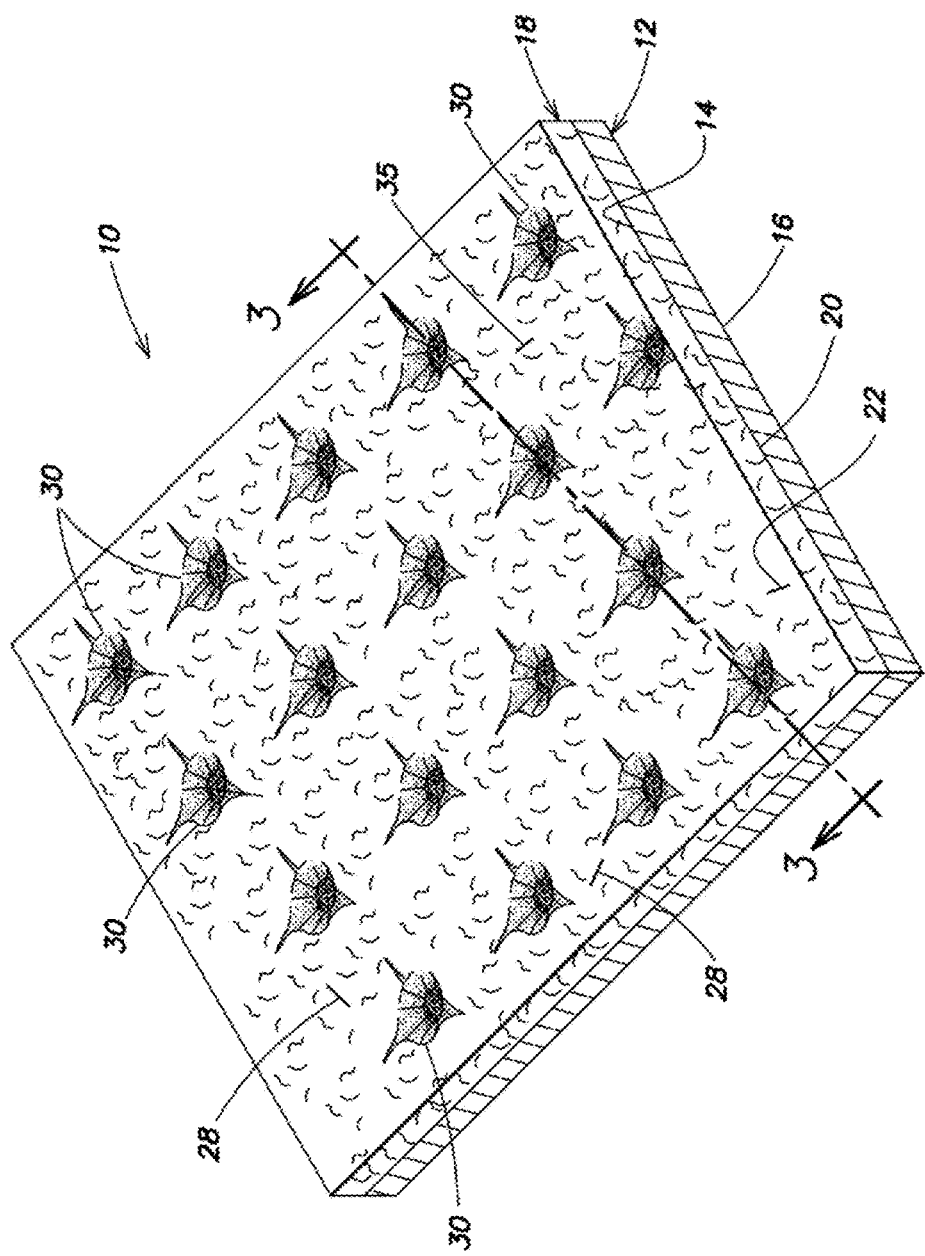
FIG. 2 is raised perspective view of a section of a first electrode for electrochemical cells constructed in accordance with the present invention and showing a galvanic pellicle secured to a support and showing a plurality of connected areas and uncompressed sections between the connected areas.
Figure 3:
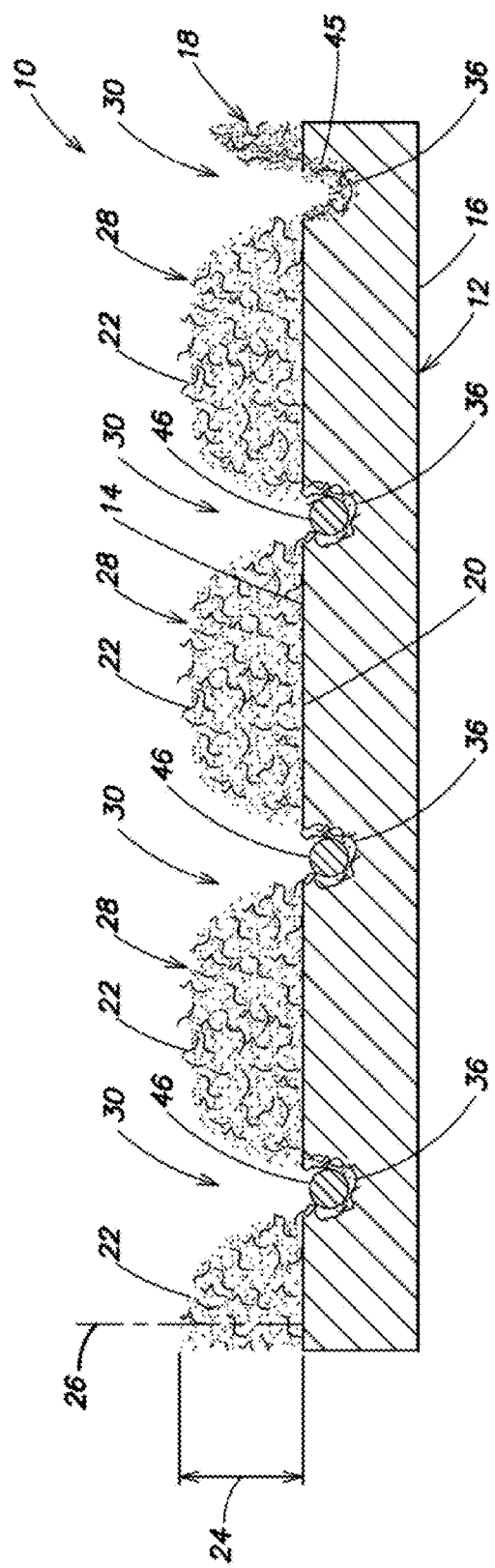
FIG. 3 is a fragmentary cross-section view of the FIG. 2 first electrode taken along sight lines 3-3 of FIG. 2.

As best shown in FIG. 2, the present electrode 10 includes a support 12 having an electrically conductive surface 14 and an opposed base surface 16. A galvanic pellicle 18 is secured to the conductive surface 14 of the support 12. The galvanic pellicle 18 has a first surface 20 and an opposed outer surface 22. As best shown in FIG. 3, the galvanic pellicle 18 also has an "uncompressed thickness dimension 24" which is defined as a longest distance of a straight axis 26 extending from a position normal to the first surface 20 and the outer surface 22 of an uncompressed section 28 of the galvanic pellicle 18. The galvanic pellicle 18 is secured to the conductive surface 14 so that the first surface 20 of the galvanic pellicle 18 is adjacent and contacts the electrically conductive surface 14.

Figure 5:
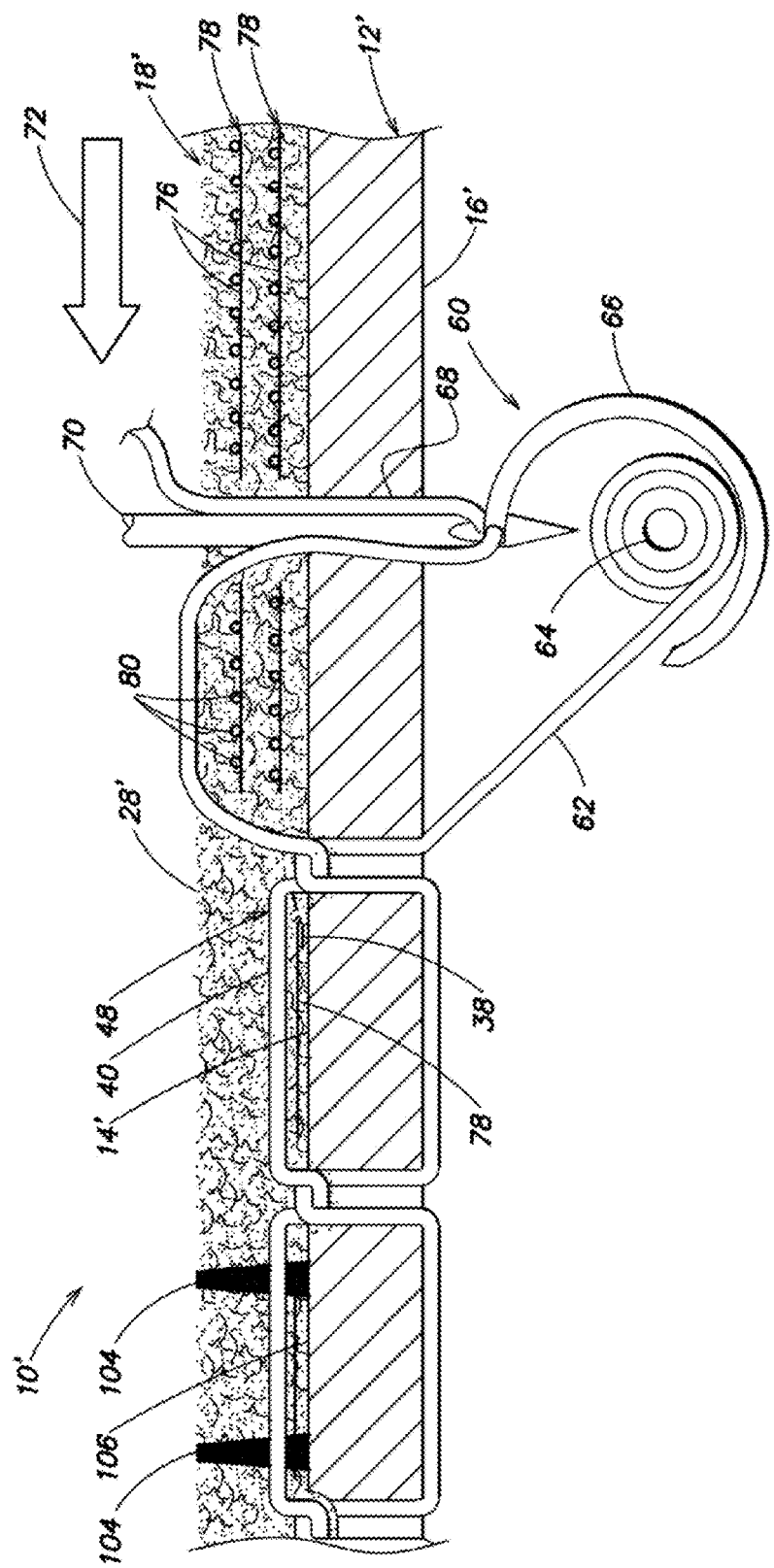
FIG. 5 is a fragmentary side view of the second electrode of the present invention having a continuous connected area made by a sewing machine positioning compression-thread to be tightened and compressing a segment of a galvanic pellicle by use of a bobbin-tension thread applying tension to the compression-thread through needle-holes within a support bearing a conductive surface of the electrode.

Additionally, the galvanic pellicle 18 is secured to the electrically conductive surface by at least one of a plurality of connected areas 30 and a continuous connected area 32 (shown in a second electrode 10' of FIG. 4). Uncompressed sections 28 of the galvanic pellicle 18 are defined between the connected areas 30 and between contiguous segments 34 of the continuous connected area 32. (It is noted that the second electrode 10' of FIGS. 4, 5 and 6 that share common components with the electrode 10 of FIGS. 2 and 3, show the common components with a reference numeral including a prime. For example, the uncompressed sections 28 of FIGS. 2 and 3 are shown in FIGS. 4, 5 and 6 as 28'.) As shown in FIG. 3 the plurality of connected areas 30 as shown in FIG. 4, the contiguous segments 34 of the continuous connected area 32 are positioned so that any point 35, 35' within any uncompressed section 28, 28' is no more distant from one of a nearest connected areas 30 and/or a nearest segment 34 of a continuous connected 32 area than about ten times the uncompressed thickness dimension 24 of the galvanic pellicle 18. (For purposes herein, the word "about" is to mean plus or minus ten percent.)

The galvanic pellicle 18 shown in FIGS. 2-5 may include at least one of; a cohesive mat 18, 18' of nonwoven single-walled carbon nanotubes 2; a cohesive mat 18 of nonwoven multi-walled carbon nanotubes (not shown); a plurality of layers 18 of multilayer graphene sheets (not shown); single-walled carbon nanotubes grown on woven carbon fiber 18; multi-walled carbon nanotubes grown on woven carbon fiber 18; and combinations thereof.

FIG. 2 shows that the uncompressed sections 28 of the electrode 10 include at least about ninety percent of the outer surface 22 of the galvanic pellicle 18. FIG. 3 shows at least one of a plurality of connected areas 30 and FIG. 4 shows a continuous connected area 32 (shown in a second electrode 10 of FIG. 4) defining compressed portions 36 embedded within the support 12 of the electrically conductive surface 14. FIGS. 4, 5 and 6 show unembedded compressed portions 38 that are between a second continuous connected area 40 (shown in FIG. 5) and a second electrically conductive surface 14'. It can be seen that the compressed portions 36, 38 of the galvanic pellicle 18 include less than about ten percent of the outer surface 22 of the galvanic pellicle 18.

One of a plurality of connected areas 30 of the galvanic pellicle 18 and a continuous connected area 32 (shown in a second electrode 10' of FIG. 4) may be embedded into the conducting metal surface 14 by compressing the full thickness of the pellicle 36 into the metal surface using a removable forming tool or die (not shown); thus filling the depression with compressed pellicle material. This is shown at reference numeral 45 on the right side of the electrode 10 of FIG. 3. Optionally, a plurality of individual connectors 46 (also shown in FIG. 3) may join with the embedded pellicle 36 if additional attachment strength is needed. It is noted that the individual connectors 46 are any connector means known in the art for compressing or embedding the entire thickness of the carbonaceous galvanic pellicle against or into a metal surface, such as the conductive surface 14 on the support 12 and for remaining in one connector piece as compressed embedded portions 36 of the pellicle material 18, plus any connectors 46 when exposed to the compressive forces described herein. The additional connector means 46 need not be themselves electrical conductors. For example, Yttrium Stabilized Zirconium, YSZ, Ni, metal alloys, hard steel and Al spheres in a range of enclosing diameters of about one fourth to two times the thickness of the galvanic pellicle uncompressed thickness dimension 24 can be forced to embed the full thickness of the pellicle without penetrating or tearing the pellicle 18 into a heated metal surface and remain embedded therein. A limitation of one fourth to two times the thickness of the galvanic pellicle applies to the minimum dimension of raised compressing structures of a removable embedding tool (not shown). Electrical conduction is from within the pellicle, through the portion of pellicle compressed and embedded into the conductive metal surface 14 forming an electron sink and finally into the metal support 12 itself.

The continuous connected area 32, or the second continuous connected area 40 may be compressed in the form of a compression-thread 48 (shown in FIGS. 5 and 6) or in the form of a planar, rigid, compression screen 50 (shown in FIG. 7), against or embedded into the electrically conductive surface 14, 14' to restrict removal of the galvanic pellicle 18, 18' from the surface when exposed to an extraction force of liquids flowing at a rate of up to about 1.0 cm/second through or over the pellicle.

As shown in FIG. 5, in an additional aspect of the electrode 10', the second continuous connected area 40 may be in the form of a compression-stitched pattern 58, which is also shown in the pattern 58 of the continuous area 32 shown in FIG. 4. The pattern 58 defines the uncompressed sections 28' between contiguous segments 34 of the compression-thread 48 of the pattern. A best seen in FIG. 5, the compression-thread pattern 58 may be formed by a sewing means 60 for producing the compression-stitched pattern 58. The sewing means 60 may include a traditional industrial sewing machine (not shown) that compresses the galvanic pellicle 18' against the electrically conductive surface 14'. Also, a bobbin-tension thread 62 of the sewing machine 60 is drawn off of a bobbin 64 and passes through a bobbin-guide 66 to be aligned adjacent a base surface 16' opposed to the electrically conductive surface 14'. The bobbin-thread 62 also loops around the compression-thread 48 at needle-holes 68 made by a needle 70 of the sewing machine 60 passing through the galvanic pellicle 18' and the conductive surface 14' and the support 12' of the conductive surface 14'. The sewing machine 60, through the bobbin-thread 62 applies a compression force upon the compression-thread 48 to compress the compression-thread 48 against the galvanic pellicle 18' and to thereby compress the galvanic pellicle 18' against the electrically conductive surface 14'. Additionally, at least one of the compression-thread 48 and the bobbin-tension thread 62 may be made of at least one of a single strand metal wire, a braided wire, a three strand braided wire, and a para-aramid synthetic fiber, and combinations thereof. It is noted that in FIG. 5 a directional arrow 72 points from the right side of the drawing to the left side to indicate that the electrode 10' having the compression stitch pattern 58 forming the second continuous connected area 40 applied to the second electrode 10' moves through the sewing machine 60 from right to left.

As shown best in the FIG. 6 electrode 10', the galvanic pellicle 18' defines a plurality of sponge-like open, through-flow pores 52 to allow normal vector fluid electrolyte 54 permeation at greater than about 0.1 Darcy. Additionally, the galvanic pellicle 18' may also define a plurality of foam-like closed pores 56 to facilitate through-flow of the electrolyte 54.

In the FIG. 6 embodiment of the second electrode 10', another second electrode 10" is secured adjacent the second electrode 10' to form a composite porous sheet electrode 74 of virtually identical electrodes 10', 10". In the composite porous sheet electrode 74, the conductive surfaces 14', 14" are in the form of a porous metal wire cloth 12', 12" having the electrically conductive metal surfaces 14', 14", 42. The second porous, electrically conductive metal surface 14" includes the contact surface 14" and an opposed base surface 16", wherein the base surface 16' surface of the second, porous electrically conductive metal surface 14" is secured adjacent the outer surface 22' of the galvanic pellicle 18' of the electrode 10'. The second porous, electrically conductive metal surface 14" includes a second porous galvanic pellicle 18"' secured to the second electrically conductive 14" metal surface of the second support 12". The two conductive metal surfaces 14', 14" and the two galvanic pellicles 18', 18" are secured sufficiently to each other to form the composite porous sheet electrode 74 so that the sheet electrode 74 is able to accommodate electrolyte normal vector flow through the composite porous sheet electrode 74 at greater than about 0.1 Darcy permeability without separation of the two conductive metal surfaces 14', 14" and the two pellicles 18', 18" forming the composite porous sheet electrode 74. (As stated above, for purposes herein, "permeability" shall mean the pressure gradient in atmospheres (atm.) required to flow liquid having 1 centipoise viscosity at velocity, $\nu$ through the face of a 1 cm cube of material. At 1 atm. and 0.1 cm/sec the permeability is 0.1 Darcy. 1 Darcy means the flow rate is 1 cm/sec at the same pressure because these relationships are linear at low velocities.)

FIG. 5 also shows schematically another aspect of the present electrode 10', wherein surfaces 76 of graphene sheets 78 within the galvanic pellicle 18' are coated with galvanic materials 80. Additionally, particles of galvanic material 80 having diameters in a range of 0.5 μm to 5 μm are configured to remain encapsulated and immobilized within the graphene sheets 78 or other graphene structures (not shown) on the graphene sheets 78 when subject to 1 centipoise electrolyte convection flow of up to about 1.0 cm/second. Further, the galvanic materials 80 encapsulated and immobilized within the galvanic pellicle 18' may be catalysts promoting redox electrochemical reactions. Alternatively, the galvanic materials 80 encapsulated and immobilized within the galvanic pellicle 18' may be faradaic or catalysts promoting redox electrochemical reactions. For purposes herein, it to be understood that "faradaics" refer to battery materials having different electro-negativities. For example, the more electronegative ones serve as anode coatings on or embedded within the CNT pellicle. They are usually the metals Li, Fe, Al, Zn, etc. The less electronegative materials are generally poor conductors which accounts for slower cathodic reactions. Examples are NiOOH coating CNT for alkali cells and various spinels using aprotic electrolyte and Li. Catalysts are different from faradaics in that they are not chemically changed by the redox reaction. The most active for most redox reactions at either electrode at low temperature are Pt, Pd, Ru, Rb and many combinations of these. However, at elevated temperatures in this invention both oxidation of fuels and reduction of oxygen can be carried out on much less expensive catalyst surfaces at nearly the same rate and efficiency as the noble metals. $MnO_x$ coating on CNT is one of those for the oxidation reduction reactions in either alkali or aprotic electrolyte and plain Ni or $NiO_x$ coating on CNT for oxidation of most fuels in alkali.

FIG. 8 shows a segment of a woven screen 82, which may also be referred to as a square weave cloth 82, that may be used to form a plurality of connected areas 83 (shown in FIG. 9) of a third electrode 84 (shown in FIGS. 9 and 10) of the present invention. Wherever strands 86 form cross-over intersections 88 the intersections effectively form the connected areas 83 that compress the galvanic pellicle against an electrically conductive surface 90 of the electrode 84 of FIGS. 9 and 10. FIG. 9 shows the FIG. 8 woven screen along view lines 9-9 of FIG. 8, which shows the cross over intersections 88 between the first conductive surface 90 of a first support 92 and a second support 90 below the woven screen 82. FIGS. 9 and 10 also show a third galvanic pellicle 96 secured between the woven screen 82 and the first support 92, including uncompressed sections 98 and compressed portions 100. The woven screen 82 may also include a weave defining open squares (windows) 102 (shown in FIG. 8) that make up greater than about 60% to about 75%, and preferably about 65%, of a projected window planar surface area defined by the woven screen 82 within the third electrode 84. The open squares define the uncompressed sections 98 of the galvanic pellicle 96. Additionally, wire strands 86 making up the woven screen 82 may be made of materials either a metal material and/or a dielectric material.

FIG. 5 shows in a left side of the electrode 10', an additional aspect of the electrode 10', wherein projection-connectors 104 are defined behind the compression-thread continuous connector 40. The projection-connectors may be made by a villiform surface 106 of the conductive surface 14'. The projection-connectors 104 form a plurality of connected areas 30' in the electrode 10'. It is to be understood that the projection-connectors could be utilized with the continuous connector compression-thread of FIG. 5, but that would be quite rare. In efficient manufacture, the projection-connectors would be most often used as the only form of connectors 30' to form the connected areas 30' of the electrode 10'.

FIG. 7 shows a simplified schematic top plan view of an alternate continuous connected area 50 in the form of a planar, rigid compression screen 50 that defines open areas 108 to define locations for uncompressed sections 28 between contiguous segments 110A, 110B, 110C, 110D of the screen, wherein the contiguous segments 110A, 110B, 110C, 110D are configured to be cooperatively positioned to define one of the open areas 108. Contiguous segments 110A, 110B, 110C, 110D can also be the raised pattern of a removable hard steel embedding compression tool.

FIG. 11 is a top plan view of a fourth electrode 112 constructed like the electrode 10 associated with FIG. 2 above, wherein connected areas 114 define a first or square pattern array 116 between the connected areas 114. Additionally, individual connected areas 114 utilize connectors of any shape or are locations 114 where the galvanic pellicle is fully embedded into the metal surface. The connected areas 114 are defined by an enclosing circular diameter of dimension less than twice but greater than one fourth the uncompressed thickness dimension 24 of the pellicle so as to prevent penetrating or cutting the pellicle. Embedded pellicle material 18 with optional connectors 46 are shown in FIG. 3 at ref. nos. 36 for compressed portions of the pellicle 18 and with connectors 46. FIG. 12 is a top plan view of a fifth electrode 120 constructed like the electrode 10 associated with FIG. 2 above, wherein connected areas 122 define a second or hexagonal pattern array 124 between the connected areas 122. Additionally, individual connected areas 122 utilize connectors of any shape or are locations 122 where the galvanic pellicle is fully embedded into the metal surface. The connected areas 114 are defined by an enclosing circular diameter of dimension less than twice but greater than one fourth the thickness of the uncompressed thickness dimension 24 of the pellicle 18 so as to prevent penetrating or cutting the pellicle 18. Embedded pellicle material with optional connectors are shown in FIG. 2 at ref, nos. 36 and 46.

An additional aspect of the disclosure is shown schematically in FIG. 6, wherein the first electrically conductive surface 14' is a metal sheet having the first galvanic pellicle 18' secured to it and the 40 14" is also a metal sheet having the second galvanic pellicle 18" secured to it. The second galvanic pellicle 18" may have a polarity distinct from the polarity of the first galvanic pellicle 18'. Alternatively, the second galvanic pellicle 18" having a polarity identical to the polarity of the first galvanic pellicle 18'. A galvanic pellicle 18" secured to a metal sheet is a half-cell electrode that can be stacked or spiral wound with other half-cell electrodes (not shown) to comprise an electrochemical cell, such as shown in FIG. 13 at ref. no. 130. The polarity of the half-cell depends upon what, if anything other than carbonaceous surfaces the pellicle contains. If nothing but carbon, polarity is determined entirely by the electric circuit connected to the half-cell. If the pellicle's carbon surfaces are coated with or contain entrained galvanic materials, it is a half-cell intended to function in an electrochemical cell with polarity determined by those galvanic (faradaic or catalyst) materials. For example, catalysts intended for fuel oxidation render the half-cell a negative anode while catalysts intended for the ORR render that half-cell a positive cathode. Similarly, materials coating or entrained in carbonaceous pellicles that are more electronegative produce a negative anode while those less electronegative produce the positive cathode half-cell.

In order to produce a functioning electrochemical cell 130, a single half-cell of a given electrochemical potential (electronegativity) or a first stack of common polarity half-cells in mutual electrical contact that increases the capacity of their collective common polarity must be separated from a second half-cell of different polarity or second such stack by a dielectric. Thus separated the two half-cells comprise as unit cell producing or accepting a measurable voltage. Unit cells can be stacked as is commonly known in series to increase voltage or in parallel to increase capacity. Many such combinations are possible such as in an electric circuit comprising both identical and distinct polarity half-cell electrodes for particular purposes.

FIG. 13 shows a stack 128 of electrodes constructed in accordance with the present invention and disposed in the form of a stack 128 of half-cell electrode sheets 129A and 129B separated by a dielectric 136 forming a core of an electrochemical cell 130 in the form of a battery 130. The battery 130 uses the electrode sheets 129A and 129B in the stack 128 wherein the sheets 129A and 129B are compressed so that strands 86' of the woven steel mesh 82 (shown in FIG. 8) act as a compressor 86' making electrical connection to porous metal conductive surfaces 132A, 132B, 134A and 134B. The stack 128 also includes a porous dielectric layer 136 of any functional thickness and structure. Above the dielectric layer 136 in FIG. 13 are the two electrode sheets 129A that include the conductive, porous surfaces 132A, 132B and attached galvanic pellicles 18" that form a cathode portion 133 of the battery 130. Below the dielectric layer 136 in FIG. 13 are the two electrode sheets 129B including the conductive, porous surfaces 134A, 134B and attached galvanic pellicles 118'" that form an anode portion 135 of the electrochemical cell 130 battery 130. The electrolyte flow arrows 139 indicate that the electrolyte is a convection electrolyte 139 and the electrode sheets 129A and 129B including in particular their galvanic pellicles 18'" and 118'" are convection electrodes 129 as described in the above-referenced and incorporated patents. (For purposes herein, the phrase "convection electrode 129" is to mean any structure that exposes the surfaces of immobilized galvanic solids (particles or coatings comprising catalyst or faradaics having electrochemical potential and/or redox activity with respect to electrolyte) to flowing fluid electrolyte AND which solids are electrically connected with very low or negligible ohmic resistance to a terminal current collector 132A, 132B, 134A, 134B.) FIG. 13 also shows electrically conducting spacers 138 between the electrode sheets 129A and between 129B at opposed ends of the battery 130 to restrict flow of an electrolyte 139 (shown schematically in FIG. 13 as flow arrows 139) out of the battery 130 through the opposed ends. Dielectric spacer 138 also serves as a seal against leakage of electrolyte flow 139. Such compressed and sealed endcaps are commonly used in electrochemical cells 130, as is well known in the art.

Because the electrode sheets 129A with attached conductive surfaces 132A, 132B form the cathodic portion 133 of the battery, the cathode portion 133 accepts electrons in a redox reaction. Hence, the cathodic portion 133 is a positive pole 133. In an example of the cell 130, the positive pole 133 may contain micro particles of Li-spinets or NiOOH that will not wash out because the are trapped within the stretched non-woven CNT galvanic pellicles 18'". Also, the pellicle material 118'– of the electrode sheets 129B with attached conductive surfaces 134A, 134B that are located below the dielectric 136 in FIG. 13, form the anode portion 135 of the battery cell 130. The anodic portion 135 supplies electrons and is therefore the negative pole 135 of the cell 130. For example, the galvanic pellicles 118''' of the anodic portion 135 may be a CNT coated with metal, e.g., Li in C or Si, Fe, Al or microparticles of MH (metal hydride). This is material that is ordinarily used in a battery 130. It will be a battery 130 with or without a convection electrolyte 139. Any metal including the conductive surfaces 134A, 134B below the dielectric layer 136 can be connected to a negative terminal (not shown) and any metal including the conductive surfaces 132A, 132B above the dielectric layer 136 can be connected to a positive terminal (not shown).

In the FIG. 13 electrochemical cell 130 battery 130, the electrode sheets 129A having conductive surfaces 132A, 132B that are located above the dielectric layer 136 have their galvanic pellicles 18''' located below their respective conductive surfaces 132A, 132B. In contrast, the electrode sheets 129B having conductive surfaces 134A, 134B that are located below the dielectric layer 136 have their galvanic pellicles 118''' located above their respective conductive surfaces 134A, 134B. This disposition of electrode sheets 129A or 129B within the cell 130 is completely arbitrary for both the cathode and anode portions 133, 135 of the cell 130. For example, the cell 130 could use any number of repeated electrode sheets 129 (B and A, respectively) both below and above the dielectric layer 136. Also, the entire stack 128 of half-cell electrodes 129A and 129B forming the unit cell 130 or battery 130 is porous so it is possible to flow the convection electrolyte 139 (which is preferred) from below the anode portion 135 upward sequentially through portions 135, dielectric separator 134 and portion 133 to exit out of the cathode portion 133. Flow direction is shown by direction of flow of the convection electrolyte by arrows 139.

Reference numeral 137 points to a place of measurement of a total compression of the pellicle by the spacers 138 (and related tie rods between end plates (not shown) or other compressing means (not shown) for applying pressure to the stack 128 of electrode sheets 129A and 129B) to thereby secure the several galvanic pellicles 18''' and 118''' adjacent to and compressed against their respective conducting surfaces 132A and 132B and 134A and 134B. The flow direction 139 is preferred because positive electrolyte cations will flow into the cathode and accelerate the redox reaction. Although the FIG. 13 cell 130 is a battery 130 without diffusive flow, the battery 130 becomes orders of magnitude more powerful with the described and illustrated electrolyte convection flow 139. What is described herein is comparable to a unit cell 130 of about 1 volt in alkali electrolyte or 4 volts for Li-ion, but with arbitrary capacity depending upon the number of half-cells 129A comprising the stack 133 and the number of half-cells 129B comprising the stack 135. It is to be understood that one may add to the FIG. 13 cell 130 as drawn and repeat the entire FIG. 13 cell 130 as many times as desired—one atop the other and flow through the entire repeated stack 128. Please note, that the anode portion 135 pole connected to a cathode portion 133 pole in a stack of unit cells 130 and repeated many times builds voltage. The key is each anode 135 and cathode 133 half-cell of repeated unit cells 130 would be separated by additional dielectric layers 136. This can be a very compact powerful battery 130. It only works for Li-ion and MH battery chemistry because in those cases each complete unit cell 130 does not alter the electrolyte 139 for the next cell (not shown) that the electrolyte 139 enters. For other battery chemistries tangential flow is required because each unit cell 130 alters the electrolyte. FIG. 15 shows that example with freestanding electrode sheets 129 having sewn or embedded galvanic pellicles 18''' and 118'''.

The FIG. 13 electrochemical cell 130 is also usable for simple fuel cells 130, e.g., $H_2$ or $CH_4$ and air or $O_2$. All that is required are appropriate catalysts, e.g., Ni or $NiO_x$ coating on CNT of the galvanic pellicles 118''' for $H_2$ oxidation in the lower anode portion 135, and $MnO_x$ coating on CNT of the galvanic pellicles 18''' within the upper cathode 133. Electrolyte flow 139 enters the unit cell 130 anode portion 135 from below after saturation with fuel gas (not shown). If there are enough electrode layers 129B in the anode portion 135, the fuel gas will be virtually fully consumed. Electrolyte 139, loaded with cation passes through the dielectric layer 136 which is porous and of substantial structure to permit entry of $O_2$ and mixing with passing electrolyte using, such as for example by using a venturi effect. An $O_2$ saturated electrolyte 139 yields to a catalyzed oxidation-reduction reaction ("ORR") in the cathode portion 133, thus completing the unit cell 130 redox reaction production of about 1 volt and multiple amps/$cm^2$. It is to be understood that an operational electrochemical cell 130 as shown in FIG. 13, would also include standard manifolds (not shown), terminals (not shown), electrical pathways (not shown), compressing means (not shown) for compressing the electrode sheets 129 to a predetermined compressive load, and other structural components well known in the art of operational electrochemical cells.

FIG. 14 shows a simplified schematic view of a supercapacitor 140, wherein a sixth electrode 142 and a seventh electrode 144 are shown and are constructed in accordance with the electrode described above in association with FIGS. 2-5. The sixth electrode 142 forms a positive electrode 142 within the supercapacitor 140, and the seventh electrode 144 forms a negative electrode 144 within the supercapacitor. Also, a first electrolyte permeable dielectric separator 146 having a first outer surface 148 and an opposed second outer surface 150 is secured between the sixth electrode 142 and the seventh electrode 144 so that an outer surface 152 of the galvanic pellicle (not shown) of the sixth electrode 142 is adjacent the first outer surface 148 of the separator. Also, an outer surface 154 of a galvanic pellicle (not shown) of the seventh electrode 144 is adjacent the opposed second outer surface 150 of the separator 146. Additionally, the separator 146 overlies and extends beyond perimeters of the sixth and seventh electrodes 142, 144 to prevent direct contact between the sixth and seventh electrodes. An additional separator 156 is located adjacent an electrically conductive surface 158 of the seventh electrode 144 (as shown in FIG. 14). It is to be understood that additional repeating combinations of similarly disposed electrodes and separators may be stacked adjacent the above described seventh electrode 144 and the additional separator 156 to enhance the storage capacity of the supercapacitor 140.

A conductive surface 160 of the sixth electrode 142 is secured in electrical communication with a negative terminal 162 of the supercapacitor 140, and the conductive surface 158 of the seventh electrode 144 is secured in electrical communication with a positive terminal 164 of the supercapacitor 140. Also, the sixth electrode 144, the electrolyte permeable dielectric separator 146, the seventh electrode 144 and the additional separator 156 are secured in a supercapacitor casing 166 that is configured so that the negative terminal 162 and the positive terminal 164 extend out of the casing 166 in electrical isolation from each other. Supercapacitors can become pseudo-supercapacitors with higher charge-discharge voltage and capacity by coating the negative electrode CNT with highly electronegative metal (e.g., Fe) and the positive electrode CNT with various metal oxides (e.g., $MnO_2$). A faradaic effect increases capacity by an order of magnitude, easily achieved with pellicles of this invention.

FIG. 15 is a cross-sectional, fragmentary side view of a second electrochemical cell 170. There are many ways to arrange the FIG. 13 sheet half-cell electrodes 129 of this invention that form the core of important electrochemical cells 130, 170. FIGS. 13 and 15 are but two examples of such cells 130, 170. FIG. 15, shows a negative anode terminal 172 attached to a solid (porous is also acceptable) metal sheet with a conductive surface 174 that also has a galvanic pellicle 176 attached to the conductive upper side of the metal sheet 174. A positive cathode terminal 180 is attached to a second solid or porous metal sheet with a conductive surface 182 that also has a second galvanic pellicle 184 attached to the lower side 186 of the sheet 182 (wherein "lower" is as shown using ordinary directions in FIG. 15). In between the first galvanic pellicle 176 and the second galvanic pellicle 184 are n such metal sheets 188 with additional upper galvanic pellicles 190 and additional lower galvanic pellicles 192 attached respectively to upper conductive surfaces 194 and to opposed lower conductive surfaces 196 of the additional n number of metal sheets 188. Each of the n number of additional metal sheets 188 is separated from the others by dielectric spacers 198 on the right side of the FIG. 15 cell 170 and by additional dielectric spacers 200 on the left side of the FIG. 15 cell.

The galvanic pellicle 176 secured to the conductive upper side 178 of the metal sheet 174 and the adjacent lower galvanic pellicle 192 secured to the lower side 196 of additional metal sheet 188 and facing the galvanic pellicle 176 cooperate to form a pair 202 of facing, polar opposite galvanic pellicles 176, 192. Each such pair 202 of facing polar opposite pellicles is spaced apart to define a space 204 and define a unit cell 206. Each intermediate metal sheet 174, 188 serves as both and anode and a cathode, thereby forming a series connection of n unit cells 206 anode to cathode repeated n times. Each metal sheet 174, 182, 188, has a galvanic pellicle 176, 184, 190, 192 attached on opposed planar sides of the sheet 174, 182, 188. However, a metal sheet 174, 182, 188 may also include two separate but adjacent metal sheets 174, 188 having a pellicle 176 attached to only one side, such as the conductive upper side 178. In such a configuration, care must be taken to cause the anode galvanic pellicle 176 to face upward as in the FIG. 15 drawing and the adjacent cathode galvanic pellicle 192 to face downward as in the FIG. 15 drawing. In this configuration, the anode pellicle 176 is loaded or coated with faradaic material (not shown) that is more electronegative than faradaic material (not shown) loaded or coating the adjacent cathodic pellicle 192. With or without convection electrolyte flow 208 (shown in FIG. 15 by flow direction arrow 208), each unit cell 206 defines a battery form or the FIG. 15 electrochemical cell 170.

Convection electrolyte flow 208 is in and through the spaces 204 in a direction normal to the plane of the drawing, so that the convection electrolyte flow 208 enters into the spaces 204 in a direction going away from the viewer, or in a direction toward the viewer of FIG. 15. As with the FIG. 13 electrochemical cell 130, the layers of electrode sheets 129 and unit cells 206 are compressed toward each other by a standard compressing means for applying a compressive force that forces the unit cells 206 toward each other, such as circumferential tie rods (not shown), compressive end plates (not shown) to secure the pellicles 176, 184, 190, 192 and seal the cell 170 for flow as described, and is well known in the art. The spaces 204 can contain flow disruptors (not shown) such as a dielectric square weave screen 82 (shown in FIG. 8) or other form of dielectric tortuous path material (not shown) provided any such material is dielectric so as to not short circuit the cell 170. FIG. 15 as shown assumes freestanding electrodes 188 to distinguish it as another example different from that of FIG. 13 which requires compression of the entire stack applied externally. It can use sewn compression thread or embedded pellicles having (connected areas and continuous connected areas) and uncompressed areas as described above. FIG. 15 can also use compressive load applied to connectors as described for FIG. 13.

FIG. 16 is a chart 210 showing plots of data comparing contact bulk resistance as a function of pressure applied to force an exemplary galvanic pellicle onto an exemplary electrically conductive surface of an exemplary electrode of the present invention. In the chart, LLP signifies "buckypaper" samples made by the inventor. NTL signifies purchased samples that were acquired from NanoLab Inc., Waltham, Mass. 02451 U.S.A. The lower pressure tests were made with a 1 inch square copper probe pressed against a pellicle supported on copper and the resistance measured in ohms. Area Normalized Resistance means that the ohmic measurement was multiplied times the area of the probe in $cm^2$. In order to know the resistance in ohms for any given area it is necessary to divide the chart value by the actual area in contact. The high pressure test was conducted with a ¼ inch square copper probe. This chart 210 provides evidence of the substantially reduced contact resistance to current flow between the exemplary galvanic pellicle and the exemplary conductive surface under the identified compressive forces.

FIG. 17 is a chart 212 showing plots of data comparing resistivity as a function of spacing distance between exemplary contact areas of an exemplary electrode of the present invention. To establish the data for the FIG. 17 chart 212, a strip of pellicle about ¼ inch wide and of substantial length was fully compressed between two pairs of ¼ inch wide square copper jaws (not shown). Each pair of jaws showed negligible resistance through the sample. The jaws were spaced apart by a measured distance so only the resistance through the plane of the pellicle was measured between jaw pairs. By knowing the length of the uncompressed part of the sample and its width and thickness a resistance measurement can be convened to resistivity in ohm-m. The value should be relatively independent of the sample length as the chart 212 shows. Again LP and NTL are in-house and purchased samples of "Buckypape", respectively. This chart 212 provides evidence of reduced contact resistance to current flow between the exemplary galvanic pellicle and the exemplary conductive surface as a spacing distance between a plurality of connected areas is reduced, and as a spacing distance between contiguous segments of a continuous connected area is reduced.

As described above, the present inventor has determined that the electrodes 10, 10' achieve remarkable performance in dramatically reducing contact resistance between the galvanic pellicle 18, 18' and the conductive surface 14, 14' under certain conditions. When a compressive force of at least 28,000 Newtons per square centimeter forces together the galvanic pellicle 18, 18' and the adjacent conductive surface 14, 14' at any of the plurality of connected areas 30, and any position 44 on the continuous connected area 32, 40, an ohmic resistance of a about 0.000004 ohm-square centimeter can be achieved between the first surface 20, 20' of the galvanic pellicle 18, 18' and the adjacent electrically conductive surface 14, 14'. Additionally, to sustain convection electrolyte flow and desired rates of electrochemical reactions and/or current flow within the pellicle 18, 18' and between the pellicle 18, 18' and the conductive surface 14, 14' the plurality of uncompressed sections 28, 28' must remain uncompressed onto the conductive surface 14, 14' by being exposed to a compressive force no greater than 0.69 Newton per square centimeter.

The embedded or compressed portions 36 of the galvanic pellicle 18 within the plurality of connected areas 30 shown in the FIGS. 2 and 3 first electrode 10, or the embedded portions 36 shown in FIGS. 3 and 4 first electrode 10' may be embedded by a removable embedding tool (not shown) and/or compression connector 46. The unembedded compressed portions 38 of the FIGS. 4, 5 and 6 second electrode 10' may be compressed by high points 88 cross-over intersections of screen connector 50 shown in FIGS. 7 and 8, or by the compression-thread 48 of the continuous connectors 32, 40 against the electrically conductive surface 14, 14' by a pressure exceeding 6,894 Newtons per square centimeters. Alternatively, the galvanic pellicle 18, 18' within at least one of the plurality of connected areas 30, and the continuous connected areas 32, 40, are compressed by the compression-thread 48 or planar screen 50 of the continuous connectors 32, 40 against the electrically conductive surface 14, 14' by a pressure exceeding 68,947 Newtons per square centimeter.

In a further aspect of the disclosure, the galvanic pellicle 18', of the first electrode 10 has an uncompressed thickness dimension that is between about 1.0 micrometer and about 1.0 millimeter. In an additional aspect of the disclosure, the electrically conductive surface 14 is a metal that is at least one of a solid structure, a porous structure, a sheet structure, a pure metal, a metal alloy, a plated metal, and combinations thereof.

In another aspect of the disclosure of the first electrode 10, and second electrode 10' shown in FIGS. 2-5, at least one of; the plurality of connected areas 30, and the continuous connected area 32. 40, are positioned so that any point 35 within the uncompressed sections 28, 28' between the at least one of the connected areas 30, and segments 34 of the continuous connected area 32, 40, is no more than between about the same as and about three times the uncompressed thickness dimension 24 of the galvanic pellicle 18, 18' from one of; a nearest connected area 30, and a nearest segment 34 of the continuous connected area 32, 40. Alternatively, at least one of; the plurality of connected areas 30, and the continuous connected area 32, 40, are positioned so that any point 35 within the uncompressed sections 28, 28' between the at least one of; the connected areas 30, and segments 34 of the continuous connected area 32, 40, is no more than between about one quarter of and about ten times the uncompressed thickness dimension 24 of the galvanic pellicle 18, 18' from one of; a nearest connected area 30, and a nearest segment 34 of the continuous connected area 32, 40.

NUMERICAL EXAMPLES

The following numerical examples explain the unique benefits of the present invention in quantitative relation to actual prior art electrochemical cells. The first example is a fuel cell. Laurencelle (see, Laurencelle F., et al, (2001) "*Characterizatioin of a Ballard MK5-E proton exchange membrane stack*", Fuel Cells, 1(1) 66-71.) used a formula by Kim (see, Kim J., Lee S-M., Srinivasan S., and Chamberlin C. E., (1995) "*Modeling of proton exchange membrane fuel cell performance with an empirical equation*", Journal of the Electrochemical Society, 142(8), 2670-2674.) to fit a Ballard Mark 5 PEMFC voltage profile, $V=E_G-ir-A\ln(i/i_o)-m(\exp(ni))$. $E_G$ is the Gibbs theoretical voltage ≈1.2 volts, i is electrode current density, r the equivalent series resistance, e.g., ESR in a capacitor, $A=RT/z\alpha F$. F, R and T are Faraday, ideal gas constant and absolute temperature, respectively. m and n are empirical coefficients. Empirical constants were matched as follows: $r=0.25$ ohm-cm$^2$, $A=0.03$ volt, $m=2.11\times 10^{-5}$ volt, $n=8$ cm$^2$/amp and $i_o$ is $3.6\times 10^{-3}$ amp/cm$^2$. $i_o$ is an important electrode design parameter that represents open circuit voltage, OCV exchange current density related to a temperature dependent 'activation' voltage, $E_\infty$ where $\Delta v_c = E_G - E_\infty = -A\ln(i_o) = 0.169$ volt in the example. From that relationship $i_i$ is $3.6\times 10^{-3}$ amp/cm$^2$.

If i is 1 amp/cm$^2$ the ESR loss is −0.25 volt. The polarization or kinetic term amounts to −0.063 volt and the Tafel term decreases voltage by −0.17 volt. That is 0.483 volt loss out of a possible 1.031 volt or 44% of the power produced. There is still a 25% voltage decrement at ½ amp/cm$^2$ producing 0.414 watt/cm$^2$. The i$^2$r loss is 0.0625 watt so 15% of the power generated goes into heat. It is why these systems cannot be operated at much more than ½ amp/cm$^2$. The example 0.25 ohm resistance is consistent with our own measured data at low contact pressure, as reported in the chart 210 at FIG 16. In the range of ½ to 1 amp/cm$^2$ ESR and $i_o$ dominate the PEMFC loss calculation. $i_o$ depends upon a number of controllable factors, e.g., catalyst or faradaic material activity, concentration and depolarization being exposed to electrolyte, Koper (see, Koper, M., Ed., Fuel Cell Catalysis, Wiley (2009), Ch. 3, page 70), Newman (see, Newman, J. et al. Electrochemical Systems, Wiley (2004) Chapter 22 and Table 11.1, page 284.). When, as in this invention, ESR is reduced to negligible values even as $i_o$ is greatly increased by higher surface and catalyst or faradaic material density there remains the ion mobility kinetic term, $-m(\exp(ni))$. In the Ballard PEMFC at 10 amps/cm$^2$ the voltage decrement is ≈10$^{30}$ volts which means the active surfaces are abysmally polarized. It would seem a hopeless objective but for the fact that the coefficient, n in the example is related to slow ion diffusion current and is reduced by 3 orders of magnitude when convection at 1 cm/sec is employed, Bagotsky (see, Bagotsky, V. S., Fundamentals of Electrochemistry, Wiley (2006) Chapter 4.4, Pages 60-61). Thus, it is purpose of this invention to create the circumstances for a transformational breakthrough in electrochemical cell performance by simultaneous elimination of ohmic and ion kinetic resistance to current density. The remaining factor is the thermodynamic Tafel relationship. It is noted that in most publications in the field it is the only relationship considered because subject matter deals with milliamps and ignores high current density applications.

The key parameter in the Tafel equation or its equivalent Butler-Volmer form is $i_o$. The expression is $i=i_o \exp(\Delta v_c/A)$ where $\Delta v_c$ is the activation voltage decrement with respect to the theoretical Gibbs free energy value. As a practical matter, operating as close as possible to optimum voltage requires that $i_o$ be as large as possible. While the parameter, A can vary over a limited range of values (≈0.15 to 0.75), $i_o$ is always less than 1.0 but can vary over multiple orders of magnitude otherwise. In the prior art example of a hydrogen/air fuel cell using noble metal catalyst and acid electrolyte at about 60° C., it is $3.6\times 10^{-3}$ amp/cm$^2$. In examples at 30° C., is 0.06 volt and $i_o$ is in the range of $10^{-4}$ to $4\times 10^{-5}$ amp/cm$^2$. $i_o$ for the hydrogen anode, usually ≈0.2 amp/cm$^2$ can be ignored because the reaction is dominated by a very low value at the oxygen (air) cathode. $i_o$ for H$_2$ oxidation on bare Pt is $5\times 10^{-4}$ amp/cm$^2$ in acid while it is orders of magnitude less for the oxygen reduction reaction, ORR (≈10$^{-8}$ in acid; $2\times 10^{-7}$ in alkali). The Ballard value of $3.6\times 10^{-3}$ amp/cm$^2$ is partly due to higher temperature but mainly due to extremely compact catalyst surface area per unit projected electrode area. 1 mg (milligram) of 3 to 5 nm Pt presents about 500 cm$^2$/cm$^2$ of projected electrode area. At least 10 to 20 mg/cm² or a better catalyst is needed at the cathode for the ORR in this example which costs about $1/watt.

The present invention operates at 250 to 300° C. where $\Delta v_c$ is 0.02 volt using $MnO_x$ catalyst coating the MWCNT of a galvanic pellicle having at least $10^5$ cm²/cm² area exposure to flowing alkali electrolyte as demonstrated below. The required value of $i_o$ is 0.5 amp/cm². 10 amps/cm² corresponds to an overvoltage of only 0.09 volt and the fuel cell delivers 1.11 volts. This is only possible when there is a design degree of freedom over $i_o$ without increasing ohmic resistance, r which must be virtually 0 and ion kinetics is supported by convection. Neither is possible in prior art. Oxidation of fuels other than $H_2$ is slower so the anode may be designed more in the fashion of the ORR with higher concentration of coated CNT per unit electrode area. Specialized catalysts for hydrocarbon fuels may be adapted for this purpose.

Similar relationships apply to secondary batteries where cathodic molar mass and activity determines reaction rate and electrode area loading requirement. For fuel cells and batteries in this invention can increase galvanic pellicle thickness without significantly increasing ohmic resistance to gain a substantial improvement in the projected electrode area value of $i_o$. Typical bulk density of uncompressed CNT in pellicle form is about 0.107 g/ml and surface area is 1500 m²/g. A 25 μm thick pellicle contains $2.72 \times 10^{-4}$ g/cm² or 0.41 m² of coatable substrate area per cm² area for an electrode surface area multiplication factor of $4.1 \times 10^3$ per 25 μm thickness. 300 μm thicknesses are easily accommodated as a further multiple of that extraordinary factor to $5 \times 10^5$ cm²/cm². It is a value that is primarily found in supercapacitor electrodes which hold CNT material, saturated in electrolyte. It is 100 times more surface area than 10 mg of 3 to 5 nm Pt. Stacks of multiple electrode layers can be used to further multiply area per cm² of projected electrode. For 300 μm pellicles on 100 μm metal current collectors 8 layers in a ⅛th inch thick stack provides a 'coating' factor of $4 \times 10^6$ cm²/cm² active electrode area devoted to convection accelerated redox reactions. This much surface area does not require the most expensive catalysts or cathode faradaics. In fact, the latter can be replaced by more efficient air/oxygen breathing cathodes.

Buckypaper prior art exemplified by the Carbon Nanotube Paper sold by Nano Lab, Inc. (see, Nano Lab, Inc. http://www.nano-lab.com/buckypaper.html) has a normal vector measured bulk resistivity of 0.1 ohm-cm. As described in the company literature, in order to make the measurement it was necessary to coat the material with gold solder which renders the pellicle impermeable but is the industry standard for connecting it to current collectors. Thus, uncompressed bulk resistance of nonwoven CNT mat having about 300 μm thickness is $3 \times 10^{-3}$ ohm over 1 cm² area which does not include contact resistance. Bulk plus contact resistance was measured by this inventor using a 1 inch square copper probe as a function of applied pressure absent Au coating of the pellicle, as reported in the chart 210 at FIG. 16. At light pressure of $6.9 \times 10^3$ Pa the average resistance was 0.3 ohm-cm². Even at ½ amp/cm² the $i^2r$ loss is 0.075 watt or 15% of the power produced at an optimistic 1 volt. Bulk resistivity in the plane of the paper was measured to be ⅙$^{th}$ the normal vector value at 0.016 ohm-cm shown in as reported in the chart 212 in FIG. 17.

At very high pressure a ¼ inch copper probe was required showing that at $4 \times 10^4$ psi ($2.76 \times 10^4$ Newton, N/cm²) the combined bulk and contact resistance is $4 \times 10^{-5}$ ohm-cm². The compressed areas become electrical current sinks. Net resistance where pellicles are compressed can be reduced to less than $10^{-5}$ ohm-cm². Thus, a 1 cm² area in contact with 10% of the metal current collector will be connected with less than $10^4$ ohm-cm², at 5% it is $2 \times 10^{-4}$ ohm-cm², etc. Even at a current density of 10 amps/cm², heat load is only 0.02 watt or ⅕$^{th}$% at 1 volt. Current production in uncompressed areas is largely unaffected by the attachment concept.

For a more formal treatment, resistivity, $\rho_p$ in the plane of the MWCNT mat between compression points is plotted in FIG. 16. It is fairly constant at wide separation, i.e., 0.016 to 0.02 ohm-cm but rises for shorter spacing due to sample distortion. If 1 cm² electrode surface is partitioned into N squares of side, s, $N=1/s^2$. Each square contains an electrical current sink to a metal current collector Watt loss is $W=(i^2/N)R_i$ where $R_i$ is resistance of a single 1 cm² element. $W=i^2(f\rho_p/Nt)$ because series connected contact resistance is negligible; $\rho_p$ is resistivity in the plane of the sheet, t is its thickness, i is current/per cm² and f is a numerical factor ≈0.35. A relationship where s=xt comes from a conduction path computer modeling analysis minimizing effective bulk resistance; then; $W=i^2(xf\rho_p t)$. Traditional conduction at $\rho_a$ through material is $W=i^2(R_c+[\rho_n t/2])$. Bulk resistances have comparable coefficients of t in either case but $R_c$ dominates at 0.3 ohm in one and is negligible at about $10^{-4}$ ohm in the other. Estimated $xf\rho_p$ is 0.02 ohm-cm. Thus, even for CF mat thickness of 0.05 cm; R/cm² for connecting it to metal will not exceed $10^{-3}$ ohm whereby 10 amps/cm² loses 0.1 watt at 1 volt or 0.1%.

Compressed and embedded areas mask a portion of the CF mat from access to electrolyte. In a particular example connection means are located at a plurality of discrete centers in a square pattern shown FIG. 11. Let d be the diameter of an idealized circular connection disc and D the center to center distance between discs. Then $\pi d^2/4D^2$ is the ratio of blocked to total electrode area. In a typical parametric example, if D=3t and d=(¾)t, 5% of the area is obscured. For a connection pattern similar to that of FIG. 4, with a plurality of discrete unattached, uncompressed area 28' areas separated as further described by production stitching, the ratio $w/D=(1-y)^{-1/2}-1$ where w is the pattern width and D is the unattached width, y is pattern area % obscured. Depending upon the CF mat thickness, a practical value of y, with t in the range of 3 to 12 mils is about 10% but, depending upon actual connector design a smaller fraction of the pattern area is actually obscured. In either case, local connecting attachment will impart a pillowing affect resembling a buttoned or stitched cushion with attachments comprising buttons or stitching. In general 5% to 10% of electrode area will be obscured by connection attachment means.

An important principle of convection in electrochemistry is operative with respect to convection electrodes and is now presented to further explain the process taking place. Ions created in one electrode must neutralize those created in its polar opposite in order for galvanic redox electrochemistry to produce or store energy by way of electrical current. This is normally shown as taking place by diffusion across electrolyte and a membrane in static architecture. What controls this process is ionic current, $i_{z+}$ neutralizing $i_{z-}$, where i is concentration per ml of positive and negative charge carriers. Assuming galvanic (faradaic or catalyst) material on both convection electrodes is well connected electrically to the metal of current collecting terminals, a principal purpose of this invention, flowing electrolyte will pick up solvated ions from particle surfaces over the entire electrochemically active surface of each electrode. Excess ion concentration in free flowing electrolyte will increase from its point of entry into the electrode to a maximum at point of exit from either a single or multilayer arrangement of such electrodes. If an ion remains attached to the particle surface that created it, farther ion production would stop. But one purpose of convection is to depolarize the reacting surface by removing the ion from proximity to that surface; essentially to sweep away the diffusion layer lying over the Helmholtz plane. The other purpose is to carry ions away from the particle entirely.

Let the projected electrode area, $A_c$ be the flow cross section of a single or stack of electrodes. If $\acute{v}$ is the gross electrolyte volumetric flow rate, the ionic charge carrier current and therefore the projected electron current density is ($i_{z+}$) $z\acute{v}F/A_c$ amps/cm$^2$, F is Faraday constant. Perhaps perspective on the meaning of electrochemical convection may be gained by supposing the electrolyte is 5 molar fully dissociated KOH for which z=1 and the flow velocity is conservatively 0.1 cm/second. For a projected 50 cm$^2$ electrode the gross flow rate is 300 ml/minute. Electrolyte flow velocity through the porous sections of the electrode is, of course, much higher. Considering only the free K$^+$ cation flow, 10 amps/cm$^2$ requires an exiting excess K$^+$ ion concentration of 10$^{-3}$ mole/ml or a 20% increase over the native 5 molar concentration of 5×10$^{-3}$ mole/ml. Saturation of free charge carrier concentration slows the oxidation reaction. However, for a fixed current demand by the load, if $i_{z+}$ is too high increase $\acute{v}$ and $i_{z+}$ will drop proportionately. 3 liters/minute reduces the increase to only 2%.

The most important takeaway from the example presented is that immediate excess ion neutralization across an ion selective semipermeable membrane is not required if convection sweeps excess ions away to a place where they can neutralize one another and thereby subsequently reconstitute the electrolyte. That is very different from diffusion where such ions must be neutralized across a short diffusion path or see no alternative opportunity.

Because free ions are a part of the dissociated ion concentration, convection electrodes become a novel free ion capacitor discharged by electrolyte flow. CNT coatings on metal electrodes of supercapacitors store an excess of ionic charge on the surfaces of the CNT within a Helmholtz layer 1 nm thick. These bind electrons or holes in the carbon molecular structure. Voltage is limited by the concentration of bound excess ion that the CNT surface can tolerate before breakdown of the Helmholtz layer. If excess ions are forcibly moved (depolarization) from the Helmholtz layer into the diffusion layer more dissociated ions can attach to the CNT surface. Ion capacitive properties of these electrodes improve response to load changes. (See, Conway, B. E., Electrochemical Supercapacitors, Plenum (1999), Ch: 16, 17.)

Another way of thinking about convection dynamics is to allow faradaic material nearest the electrolyte entry to be used disproportionately at first so that the active zone migrates away from that point toward the electrolyte exit point. Regarding fuel cells, concentrated fuel at point of entry is consumed faster by virtue of maximum concentration and less so as it is consumed. In either case the exiting product, ($i_{z+}$)$z\acute{v}F$ controls current density and convection velocity is the more important factor.

For purposes of this invention, 'convection electrode' shall mean any structure that exposes the surfaces of immobilized galvanic solids (particles or coatings comprising catalyst or faradaics having electrochemical potential and/or redox activity with respect to electrolyte) to flowing fluid electrolyte AND which solids are electrically connected with very low or negligible ohmic resistance to a terminal current collector. The fluid may be liquid or a liquid containing gas as either 1) dissolved, 2) entrained as bubbles or foam or 3) as an aerosol mixture of gas and liquid. For further purposes of this invention, 'flowing fluid' shall be understood to mean projected fluid velocity, v up to about 1 cm/sec whether over solid or through porous surfaces or media.

Permeability shall mean the pressure gradient in atmospheres (atm) required to flow liquid having 1 centipoise viscosity at velocity, v through the face of a 1 cm cube of material. At 1 atm and 0.1 cm/sec the permeability is 0.1 darcy. 1 darcy means the flow rate is 1 cm/sec at the same pressure since these relationships are linear at low velocities. Pressure, p required to motivate convective electrolyte flow for purposes of this invention shall be such that the product, pv, or the power producing the flow per cm$^2$ of electrode is an acceptable fraction of the power produced by the electrode. At 1 atm pressure gradient and 1 cm/sec flow velocity, the power, pv imparted to electrolyte flow is 0.1 watt/cm$^2$. That could easily be more than 10% of the power generated by 1 cm$^2$ of prior art electrodes. Except for high convective velocity now made possible by the instant invention, concepts of electrochemical convection have been discussed and analyzed at length in the extant literature (see, Bagotsky, V. S., Fundamentals of Electrochemistry, Wiley (2006) Chapter 4.4, Pages 60-61); Newman, J. et al, Electrochemical Systems, Wiley (2004) Chapter 22 and Table 11.1, page 284; and, Gordon, M. and Suppes, G., Convection Battery—Modeling, Insight, and Review, AIChE Journal, Aug. 18, 2013 Vol, 59, No. 8, 2833-2842.)

Galvanic pellicles can be commercially supplied as freestanding randomly entangled fibrous nonwoven mats (buckypaper) of single and multiwalled CNT or in powder form with fibers having diameters of 8 to 80 nm and lengths of 20 to 800 micrometers ("μm"). Longer CNT fibers are generally of larger diameter and consequently present less reaction surface density which varies inversely as fiber diameter. Shorter CNT fibers are not commonly found in buckypaper form. Pure powders are available at low cost ($10/kg) either dry or in suspension. In a useful and instructive example, CNT in suspension can be pre-coated with a 5 to 10 nm layer of MnO$_x$ catalyst for O$_2$ reduction by known chemical means prior to affixing coated fibers to the metal or by way of electrochemical deposition from permanganate after the fiber bundle is connected to the metal electrode, Sassin (see, Sassin, M. B. et al, Redox Deposition of Nanoscale Metal Oxides on Carbon for Next-Generation Electrochemical Capacitors, Accounts of Chemical Research, Oct. 26, 2011). CNT can also be coated with metal and metal oxide catalysts for anode fuel oxidation using similar methods, Chung (see, Chung, H. T., et al, Nature Communications, 28 May 2013, Active and stable carbon nanotube/nanoparticle composite electrocatalyst for oxygen reduction; Gorlin, Y., JACS Communications, Sep. 14, 2010, A Bifunctional Nonprecious Metal Catalyst for Oxygen Reduction and Water Oxidation; Wang, H., et al, Nature Communications, 21 May 2012; Zou, Xiaoxin., et al, Cobalt-Embedded Nitrogen-Rich Carbon Nanotubes Efficiently Catalyze Hydrogen Evolution Reaction at All pH Values, Angewandte Chemie, (2014) 126, 4461-4465). CF coatings concentrate inexpensive but effective catalysts as well as battery anode and some cathode faradaics to an unprecedented degree for any electrode and only now for a unique convection electrode. In some cases, e.g., Li-ion batteries use micron size particles as battery cathode materials (see, Ma, Xiaohua et al, High Rate Micrometer Ordered LiNi0.5Mn1.5O4, Journal of The Electrochemical Society, 157 (8) pp: A925-A931 (2010)). These can now be immobilized in the presence of electrolyte convection by trapping within or between connected CF mats as described in this invention.

In a particular structural example suitable for industrial mass production, this invention permanently attaches CF mat to a metal support compatible with the electrolyte by means of sewing or embedment of a portion of the CF mat onto or into the metal support which may or may not include embedding particles, as described above in association the Detailed Description of FIG. 5. Normally the metal will be in sheet form, either solid or porous. These are the most practical CF mat electrode/metal current collector because a single metal sheet or metal surface with attached CF surface coating becomes a freestanding electrode.

The freestanding sewn compression connector is described as one possible compression connector example. Several factors are important. First the thread must made from very high tensile strength material, e.g., metal alloys or a product described as a para-aramid synthetic fiber and sold under the trademark "KEVLAR" by the DuPont DE Nemours company of Wilmington Del., U.S.A. In order to apply pressure, P of $10^5$ psi against the pellicle and metal support for a single strand thread, ($\approx$2 F/sd)=P, F being force in lbs., s is stitch length and d is thread diameter; about 10 to 50 lbs. of tensile force is required for thread diameters in the range of 2 to 8 mills, respectively and stitch lengths of 0.1 inch. Thread diameter cannot be less than ¼ to ½ CF mat thickness. Thicker mats need larger stronger thread. Three strand braided thread is considerably stronger than single strand and applies about twice as much pressure because it has about half the contact area of a single strand. Tension required is 5 to 25 lbs. which relaxes sewing machine requirements although a heavy duty industrial grade machine is required to do this job. A product sold under the trademark "KEVLAR" 2 to 3 mil or SS alloy 20 μm to 2 mil 3 strand braided threads will provide the required strength but "KEVLAR" can only be used with aprotic or some organic electrolytes.

An example of externally fastened embodiment of compression connectors uses fine Rockwell hard stainless alloy steel wire cloth compressed against an otherwise unattached CF mat. If the cloth is a simple square weave and is compressed between two metal sheets, at least one being covered with CF mat the high points on each side of the metal cloth will compress one or both mats against their respective supporting metal surfaces as illustrated in FIG. 9. Commercially available 30×30 and 100×100 mesh, having 7 and 2.2 mil diameter wire, respectively, have >60% open area and >70% open volume. These are particularly useful for accommodating 13 and 4 mil thick CF mats with 34 and 10 mil centerline spacing between wires, respectively. For thin galvanic pellicles 20 μm wire on 100 μm center spacing can be made to compress 30 to 40 μm thick CF mats. Masked contact can be approximated by a square with sides no larger than the wire diameter. In all cases masked contact is 5% or less. Larger and smaller mesh screens can be used to accommodate thicker or thinner CF mats. If the wire cloth is thicker than a CF mat it is compressing there will be empty volume suitable for tangential electrolyte flow over the connected CF mat layer. 20 μm SS wire is available for this purpose. There are many possible means for imposing multiple local points of mechanical compression to a CF mat in order to functionally adhere and electrically connect it to its supporting metal surface. The key concept for low resistance attachment of a galvanic pellicle to an electrically conductive surface of a metal substrate current collector is that the spacing between nearest local points of mechanical compression not be greater than between about one quarter to about three times the uncompressed thickness dimension of the pellicle. Various means for accomplishing the purposes described in this invention are subsumed and included within the attached claims.

Therefore, the purposes of this invention include: 1) Electrical connection at $10^{-3}$ ohm-cm² or less of as cohesive CF mat highly permeable to electrolyte to a solid or porous metal surface immobilized with respect to strong electrolyte convection, (none exists in the prior art) and; 2) CF mats with individual CNT having length of 20 to 800 μm and 8 to 80 μm diameter, and; 3) CF mats having thickness on the order of 25 to 1000 μm that remain immobilized with respect to electrolyte convection over or through the mat and that remain largely uncompressed after electrical connection to the metal surface and; 4) Immobilized CF mats attached to the metal when subjected to liquid convective flow having convective velocity in excess of 0.1 cm/second whether the flow is tangential over or perpendicular through the coating and; 5) Structure whereby CF mat attachment and electrical connection is secured through direct embedment of the CF mat into the metal support with or without embedded-connector particles or compression connectors securing the CF mat onto the metal support by attachment means forcing CF mat against the metal surface or by compression of adjacent structures; and; 6) Embedment or compression connector contact area dimension in the range of ¼ to ½ CF mat thickness, and; 7) Sewn compression connectors using thread adjacent the CF mat of ¼ to ½ CF mat thickness and bobbin thread both having high tensile strength and; 8) CF durably coated with nanoscale catalyst or faradaic particles or such particles of 1 to 5 μm dimension immobilized within the attached CF mat to form a composite electrode and; 9) CF mat with embedded but unconnected voids or pores to increase mat permeability to electrolyte to >0.1 Darcy; 10) Application of static stack pressure ($10^5$ psi) to compression connectors to immobilize the CF mat adjacent a metal surface wherein pressure against the mat is applied by compression connectors comprising woven screens, sewn thread or a villiform metal surface, or particles having thickness greater than the CF coating thickness) and; 11) CF mats applied to one or both sides of solid or porous metal sheets that can be assembled as convection capable electrodes. The two sides can have the same or opposite polarity and; 12) CF mat masked attachment of connected areas and/or a continuously connected area comprising <10% electrode area and; 13) Size, spacing and pattern of uncompressed and compressed areas arranged so that the electrical conduction path from uncompressed areas to compressed areas is short enough to adequately minimize net CF mat impedance.

The electrode structure 10, as described in this invention solves, in one stroke, the galvanic pellicle 18/conductive surface 14 and metal current collector support 12 interfacial resistance problem, a galvanic pellicle 18 bulk electrical conductivity issue and immobilizes the pellicle 18 onto a conductive surface 14 and/or a supporting metal current collector 12 surface 14 for electrolyte convection compatibility and cohesive stability.

While the present disclosure has been presented above with respect to the described embodiments of an electrode for electrochemical cells, it is to be understood that the disclosure is not to be limited to those illustrations and described embodiments. Accordingly, reference should be made primarily to the following claims rather than the forgoing description to determine the scope of the disclosure.

What is claimed is:
1. An electrode for electrochemical cells, the electrode comprising:
   a. an electrically conductive surface;
   b. a galvanic pellicle having a first surface and an opposed outer surface, wherein the galvanic pellicle also has an uncompressed thickness dimension being a longest distance of a straight axis extending from a position normal to the first surface to contact the outer surface of an uncompressed section of the galvanic pellicle;

c. the galvanic pellicle being secured to the electrically conductive surface so that the first surface of the galvanic pellicle is adjacent the electrically conductive surface;

d. wherein the galvanic pellicle is secured to the electrically conductive surface by at least one of; a plurality of connected areas, and a continuous connected area, wherein uncompressed sections of the galvanic pellicle are defined between at least one of; the plurality of connected areas; and between contiguous segments of the continuous connected area of the galvanic pellicle, and wherein the plurality of connected areas and the segments of the continuous connected areas are positioned so that any point within any uncompressed section is no more distant from one of a nearest connected area and a nearest segment of a continuous connected area than about ten times the uncompressed thickness dimension of the galvanic pellicle e. wherein the galvanic pellicle comprises at least one of; a cohesive mat of nonwoven single-walled carbon nanotubes; a cohesive mat of nonwoven multi-walled carbon nanotubes; a plurality of layers of multilayer graphene sheets; single-walled carbon nanotubes grown on woven carbon fiber; multi-walled carbon nanotubes grown on woven carbon fiber; and combinations thereof; and f. wherein the galvanic pellicle is coupled by a connector against the electrically conductive surface forming the plurality of connected areas or the continuous connected area, wherein the plurality of connected areas or the continuous connected area are at a pressure exceeding 6,894 Newtons per square centimeters.

2. The electrode for electrochemical cells of claim 1, wherein the uncompressed sections include at least about ninety percent of the outer surface of the galvanic pellicle, and wherein at least one of; the plurality of connected areas, and the continuous connected area define compressed portions of the galvanic pellicle compressed between the connected areas and the electrically conductive surface so that the compressed portions of the galvanic pellicle include less than about ten percent of the outer surface of the galvanic pellicle.

3. The electrode for electrochemical cells of claim 1, wherein at least one of; any of the plurality of connected areas, and any point on the continuous connected area, have an ohmic resistance between the first surface of the galvanic pellicle and the adjacent electrically conductive surface of about 0.000004 ohm-square centimeter whenever at least one of; the plurality of connected areas and the electrically conductive surface are compressed together, and the continuous connected area and the electrically conductive surface are compressed together, by a compressive force of at least 28,000 Newtons per square centimeter, and whenever the plurality of uncompressed sections remain uncompressed onto the conductive surface by being exposed to a compressive force no greater than 0.69 Newton per square centimeter.

4. The electrode for electrochemical cells of claim 1, wherein within at least one of; the plurality of connected areas, and the continuous connected area, the galvanic pellicle is one of; compressed by a connector against the electrically conductive surface to restrict removal of the galvanic pellicle from the surface when exposed to an extraction force of liquids flowing at a rate of up to about 1.0 cm/second; and, embedded by the connector within the electrically conductive surface to restrict removal from the surface when exposed to an extraction force of liquids flowing at a rate of up to about 1.0 cm/second.

5. The electrode for electrochemical cells of claim 1, wherein the galvanic pellicle defines open, through-flow pores to allow normal vector fluid electrolyte permeation at greater than about 0.1 Darcy.

6. The electrode for electrochemical cells of claim 1, wherein the galvanic pellicle within at least one of; the plurality of connected areas, and the continuous connected area, is compressed by a connector against the electrically conductive surface by pressure exceeding 68,947 Newtons per square centimeter.

7. The electrode for electrochemical cells of claim 1, wherein the galvanic pellicle includes open pores to be porous, the electrically conductive surface is a first porous metal having a contact surface and an opposed support surface, a second porous metal includes a second electrically conductive surface having a contact surface and an opposed support surface, wherein the contact surface of the second electrically conductive metal surface is secured adjacent the outer surface of the galvanic pellicle that is secured to the contact surface of the first metal conductive surface, and the second porous, electrically conductive metal surface includes a second porous galvanic pellicle secured to the support surface of the second porous electrically conductive surface, and the two electrically conductive surfaces and two galvanic pellicles are secured sufficiently to each other to form a composite porous sheet electrode to accommodate electrolyte normal vector flow through the composite porous sheet electrode at greater than about 0.1 Darcy permeability without separation from each other of the conductive surfaces and galvanic pellicles forming the composite porous sheet electrode.

8. The electrode for electrochemical cells of claim 1, wherein surfaces of graphene on the graphene sheets are coated with galvanic materials.

9. The electrode for electrochemical cells of claim 1, wherein particles of galvanic material having diameters in a range of 0.5 µm to 5 µm are configured to remain encapsulated and immobilized within graphene structures on the graphene sheets when subject to electrolyte convection flow of up to about 1.0 cm/second.

10. The electrode for electrochemical cells of claim 9, wherein the galvanic materials encapsulated and immobilized within the galvanic pellicle are catalysts promoting redox electrochemical reactions.

11. The electrode for electrochemical cells of claim 9, wherein the galvanic materials encapsulated and immobilized within the galvanic pellicle are faradaic promoting redox electrochemical reactions.

12. The electrode for electrochemical cells of claim 1, wherein the connected areas are in the form of a woven screen compressing the galvanic pellicle against the electrically conductive surface.

13. The electrode for electrochemical cells of claim 12 wherein the woven screen includes a weave defining open squares that make up greater than between about 60% and about 75% of the area defined by the woven screen, and the open squares define the uncompressed sections of the galvanic pellicle.

14. The electrode for electrochemical cells of claim 12 wherein wires making up the woven screen are made of materials being one of a metal material and a dielectric material.

15. The electrode for electrochemical cells of claim 1, wherein connectors within the connected areas include projections extending into the galvanic pellicle from a villiform surface defined on the electrically conductive surface.

16. The electrode for electrochemical cells of claim 1, wherein the uncompressed thickness length of the galvanic pellicle is between about 1 micrometer to about 1 millimeter.

17. The electrode for electrochemical cells in accordance with claim 1, wherein the electrically conductive surface is a metal sheet having a first electrically conductive surface, an opposed second electrically conductive surface, the second electrically conductive surface also having a second galvanic pellicle secured to the second electrically conductive surface, wherein the second galvanic pellicle is one of a second galvanic pellicle having a polarity distinct compared to the polarity of the first galvanic pellicle, and a second galvanic pellicle having an identical polarity to the polarity of the first galvanic pellicle.

18. The electrode for electrochemical cells of claim 1, further comprising a plurality of additional electrodes made in accordance with claim 1, wherein the plurality of additional electrodes are stacked in a cooperative functional relationship with the electrode of claim 1.

19. The electrode for electrochemical cells of claim 1, wherein the continuous connected areas are in the form of a compression-stitched pattern, wherein the pattern defines the uncompressed sections between segments of a compression-thread of the pattern, wherein the compression-thread compresses the galvanic pellicle against the electrically conductive surface, wherein a bobbin-tension thread adjacent a support surface opposed to the electrically conductive surface loops around the compression-thread at needle-holes within the conductive surface and applies a compression force upon the compression-thread to compress the compression-thread against the galvanic pellicle and to thereby compress the galvanic pellicle against the electrically conductive surface.

20. The electrode for electrochemical cells of claim 19, wherein at least one of the compression-thread and the bobbin-tension thread are made of at least one of a single strand metal wire, a braided wire, a three strand braided wire, and a para-aramid synthetic fiber.

21. The electrode for electrochemical cells of claim 1, wherein the galvanic pellicle defines a plurality of through-flow open pores, and also defines a plurality of closed pores.

22. The electrode for electrochemical cells of claim 1, wherein the electrically conductive surface is a metal and further comprises at least one of a solid structure, a porous structure, a sheet structure, a pure metal, a metal alloy, a plated metal, and combinations thereof.

23. The electrode for electrochemical cells of claim 1, wherein at least one of; the plurality of connected areas, and the continuous connected area, are positioned so that any point within the uncompressed sections between the at least one of the connected areas, and segments of the continuous connected area, is no more than between about one quarter of and about three times the uncompressed thickness dimension of the galvanic pellicle from one of; a nearest connected area, and a nearest segment of the continuous connected area.

24. The electrode for electrochemical cells of claim 1, wherein at least one of; the plurality of connected areas, and the continuous connected area, are positioned so that any point within the uncompressed sections between the at least one of; the connected areas, and segments of the continuous connected area, is no more than between about one quarter of and about the same as the uncompressed thickness dimension of the galvanic pellicle from one of; a nearest connected area, and a nearest segment of the continuous connected area.

25. The electrode for electrochemical cells of claim 1, wherein the outer surface of the galvanic pellicle is at least one of; compressed onto the electrically conductive surface within the connected areas, and compressed into the electrically conductive surface within the connected areas.

26. The electrode for electrochemical cells of claim 1, wherein the connected areas define an enclosing circular diameter having a dimension less than about twice the uncompressed thickness dimension of the galvanic pellicle and the enclosing circular diameter also having a dimension greater than about one fourth the uncompressed thickness dimension of the pellicle to prevent penetrating or cutting the pellicle.

27. The electrode for electrochemical cells of claim 1, wherein at least one of the; a cohesive mat of nonwoven single-walled carbon nanotubes; a cohesive mat of nonwoven multi-walled carbon nanotubes; a plurality of layers of multilayer graphene sheets; single-walled carbon nanotubes grown on woven carbon fiber; multi-walled carbon nanotubes grown on woven carbon fiber; and combinations thereof include at least one of carbon surfaces that are coated with galvanic materials, and entrained galvanic materials, immobilized within the galvanic pellicle.

28. The electrode for electrochemical cells of claim 27, wherein the galvanic material immobilized within the galvanic pellicle are catalysts promoting redox electrochemical reactions, wherein particles of the galvanic material having diameters in a range of 0.5 μm to 5 μm, are configured to remain immobilized within the galvanic pellicle when the pellicle is subject to electrolyte convection flow of up to about 1.0 cm/second.

29. The electrode for electrochemical cells of claim 27, wherein the galvanic materials immobilized within the galvanic pellicle are faradaic materials promoting redox electrochemical reactions, wherein particles of the faradaic materials having diameters in a range of 0.5 μm to 5 μm, are configured to remain immobilized within the galvanic pellicle when subject to electrolyte convection flow of up to about 1.0 cm/second.

30. An electrode for electrochemical cells, the electrode comprising:
   a. an electrically conductive surface;
   b. a galvanic pellicle having a first surface and an opposed outer surface, wherein the galvanic pellicle also has an uncompressed thickness dimension being a longest distance of a straight axis extending from a position normal to the first surface to contact the outer surface of an uncompressed section of the galvanic pellicle;
   c. the galvanic pellicle being secured to the electrically conductive surface so that the first surface of the galvanic pellicle is adjacent the electrically conductive surface;
   d. wherein the galvanic pellicle is secured to the electrically conductive surface by at least one of; a plurality of connected areas, and a continuous connected area, wherein uncompressed sections of the galvanic pellicle are defined between at least one of; the plurality of connected areas; and between contiguous segments of the continuous connected area of the galvanic pellicle, and wherein the plurality of connected areas and the segments of the continuous connected areas are positioned so that any point within any uncompressed section is no more distant from one of a nearest connected area and a nearest segment of a continuous connected area than about one quarter of and about ten times the uncompressed thickness dimension of the galvanic pellicle, wherein the galvanic pellicle is coupled by a connector against the electrically conductive surface forming the plurality of connected areas or the continuous connected area, wherein the plurality of connected areas or the continuous connected area are at a pressure exceeding 6,894 Newtons per square centimeters; and, e. wherein the electrode is in the form of a convection electrode.

31. The electrode of claim 30, wherein the galvanic pellicle comprises at least one of; a cohesive mat of nonwoven single-walled carbon nanotubes; a cohesive mat of nonwoven multi-walled carbon nanotubes; a plurality of layers of multilayer graphene sheets; single-walled carbon nanotubes grown on woven carbon fiber; multi-walled carbon nanotubes grown on woven carbon fiber; and combinations thereof.

32. The electrode of claim 31, wherein the convection electrode is secured within an electrochemical cell.

33. The electrode of claim 32, wherein the uncompressed sections include at least about ninety percent of the outer surface of the galvanic pellicle, and wherein at least one of; the plurality of connected areas, and the continuous connected area define compressed portions of the galvanic pellicle compressed between the connected areas and the electrically conductive surface so that the compressed portions of the galvanic pellicle include less than about ten percent of the outer surface of the galvanic pellicle.

34. The electrode of claim 32, wherein at least one of; any of the plurality of connected areas, and any point on the continuous connected area, have an ohmic resistance between the first surface of the galvanic pellicle and the adjacent electrically conductive surface of about 0.000004 ohm-square centimeter whenever at least one of; the plurality of connected areas and the electrically conductive surface are compressed together, and the continuous connected area and the electrically conductive surface are compressed together, by a compressive force of at least 28,000 Newtons per square centimeter, and whenever the plurality of uncompressed sections remain uncompressed onto the conductive surface by being exposed to a compressive force no greater than 0.69 Newton per square centimeter.

35. An electrode for electrochemical cells, the electrode comprising:

an electrically conductive surface;

a galvanic pellicle having a first surface and an opposed outer surface, wherein the galvanic pellicle also has an uncompressed thickness dimension being a longest distance of a straight axis extending from a position normal to the first surface to contact the outer surface of an uncompressed section of the galvanic pellicle; the galvanic pellicle being secured to the electrically conductive surface so that the first surface of the galvanic pellicle is adjacent the electrically conductive surface; and, the galvanic pellicle being physically and electrically connected to the electrically conductive surface at a plurality of discrete locations by one of; compression of the outer opposing galvanic pellicle surface toward the conducting surface with sustained pressure not less than 7,000 Newton/cm$^2$ and embedment of both first and outer opposing galvanic pellicle surfaces into the conducting surface.

36. The electrode of claim 35, wherein the electrically conducting surface is one of; solid and porous metal.

37. The electrochemical cell of claim 36, wherein the galvanic pellicle is physically and electrically connected to a metal surface at a plurality of discrete locations, the locations comprising at least one of; discrete areas enclosable by a circle and line segments, either discrete or contiguous having a defined width, wherein the circle diameter and line segment width is not less than $\frac{1}{4}^{th}$ of and not greater than galvanic pellicle thickness.

38. The electrochemical cell of claim 37, wherein no point within one of; an uncompressed and unembedded portion of a galvanic pellicle is further from the nearest one of; a compressed and embedded location than 10 times the thickness dimension of the galvanic pellicle.

* * * * *